US012807773B2

(12) United States Patent
Sigwald et al.

(10) Patent No.: US 12,807,773 B2
(45) Date of Patent: Nov. 24, 2026

(54) BIAXIALLY-ORIENTED POLYETHYLENE FILM AND METHOD OF PRODUCTION

(71) Applicant: TOTALENERGIES ONETECH, Courbevoie (FR)

(72) Inventors: Armelle Sigwald, Seneffe (BE); Kaitie Giffin, Seneffe (BE); Gaëtan Henry, Seneffe (BE); Alvaro Fernandez, Seneffe (BE); Christian Penu, Seneffe (BE)

(73) Assignee: TOTALENERGIES ONETECH, Courbevoie (FR)

( * ) Notice: Subject to any disclaimer, the term of this patent is extended or adjusted under 35 U.S.C. 154(b) by 249 days.

(21) Appl. No.: 18/727,419

(22) PCT Filed: Jan. 20, 2023

(86) PCT No.: PCT/EP2023/051352
§ 371 (c)(1),
(2) Date: Jul. 9, 2024

(87) PCT Pub. No.: WO2023/139201
PCT Pub. Date: Jul. 27, 2023

(65) Prior Publication Data

US 2025/0075044 A1 Mar. 6, 2025
US 2025/0326903 A9 Oct. 23, 2025

(30) Foreign Application Priority Data

Jan. 21, 2022 (EP) .................................... 22315018

(51) Int. Cl.
*C08J 5/18* (2006.01)
*C08F 210/16* (2006.01)

(52) U.S. Cl.
CPC ............... *C08J 5/18* (2013.01); *C08F 210/16* (2013.01); *C08J 2323/08* (2013.01)

(58) Field of Classification Search
CPC ...... C08F 2/001; C08F 210/14; C08F 210/16; C08F 2500/04; C08F 2500/07; C08F 2500/12; C08F 2500/26; C08F 2500/27; C08F 2500/34; C08J 2323/08; C08J 5/18; C08L 23/06; C08L 23/0815
See application file for complete search history.

(56) References Cited

FOREIGN PATENT DOCUMENTS

| | | |
|---|---|---|
| EP | 3291960 | 3/2018 |
| WO | WO 2019/241045 | 12/2019 |

(Continued)

OTHER PUBLICATIONS

Ruocco et al, WO 2021119158, Jun. (Year: 2021).*

(Continued)

*Primary Examiner* — Lawrence D Ferguson
(74) *Attorney, Agent, or Firm* — NORTON ROSE FULBRIGHT US LLP

(57) ABSTRACT

The present disclosure relates to a biaxially-oriented polyethylene film remarkable in that it comprises a polyethylene resin having a melt index MI2 ranging from 0.5 to 3.0 g/10 min, a density of at least 0.950 g/cm3; an Mw/Mn of at least 8.0; and a z average molecular weight (Mz) of at least 800,000 g/mol; an Mz/Mw of at least 6.0. The present disclosure also relates to an polyethylene resin for the production of such film and to a process to produce such film.

19 Claims, 5 Drawing Sheets

(56) References Cited

FOREIGN PATENT DOCUMENTS

| | | |
|---|---|---|
| WO | WO 2021/079255 | 4/2021 |
| WO | WO 2021/118739 | 6/2021 |

OTHER PUBLICATIONS

PCT International Preliminary Report on Patentability issued in International Application No. PCT/EP2023/051352, dated Aug. 2, 2024.

PCT International Search Report and Written Opinion issued in International Application No. PCT/EP2023/051352, dated Mar. 30, 2023.

* cited by examiner

BIAXIALLY-ORIENTED POLYETHYLENE FILM AND METHOD OF PRODUCTION

CROSS-REFERENCE TO RELATED APPLICATIONS

This application is a national phase application under 35 U.S.C. § 371 of International Application No. PCT/EP2023/051352, filed Jan. 20, 2023, which claims priority to European Patent Application No. 22315018.6, filed Jan. 21, 2022. The contents of the referenced applications are incorporated into the present application by reference.

TECHNICAL FIELD

The present disclosure relates to polyethylene resins and articles made from such polyethylene resins such as films and biaxially oriented films. The present disclosure also relates to the process to produce said polyethylene resins and to produce said articles such as films and biaxially oriented films.

TECHNICAL BACKGROUND

As global interest in reducing packaging waste is growing, there is an increasing amount of effort to develop technologies that would enhance the possibility to recycle plastic products such as films. Flexible packaging film structures are often formed of multiple types of polymeric materials including, for example, polyethylene, polypropylene, ethylene vinyl alcohol, polyethylene terephthalate, polyamide and others. Such materials are typically combined to achieve a balance of properties that are beyond the reach of a single material type. However, due to the dissimilarity of these materials, the final package is typically not easy to recycle.

Thus, there is also a movement towards single component structures (e.g., all polyethylene structures) to improve the recyclability profile.

There is, therefore, a need for films made of polyethylene (PE) that show the same or at least comparable mechanical properties as plurimaterial films, while improving recyclability.

It is well known that polymeric films may be oriented by stretching the films in two directions. In a first step, films of a given thickness are cast. Then, in a second step, films can be stretched sequentially—first in the "machine" direction (MD) and then in the "transverse" direction (TD), or simultaneously (with stretching forces being applied in both directions at the same time). One common sequential stretching process is known as the "tenter frame" process. The resulting films are generally referred to as being "biaxially oriented" or "bi-oriented". The tenter frame process is commonly used with films made from polyamide, polyethylene terephthalate (PET) and especially polypropylene (PP). However, the tenter frame process has been less successful with polyethylene (PE) because PE is comparatively difficult to stretch.

Therefore, in the case of flexible packaging film being biaxially oriented polyethylene (BOPE) films, there is also a need for good processability for the PE raw material in the oriented film production process. Good processability implies a high stretch ratio in both machine and transverse direction as well as a good operation window in terms of the stretchability temperature.

WO2021079255 describes a biaxially oriented polyethylene (BOPE) process that uses a selected polyethylene having a medium density and a very broad molecular weight distribution. The use of this selected polyethylene facilitates stretching in the BOPE process in comparison to previously used polyethylene resins having a higher density and/or a narrower molecular weight distribution.

WO2021/118739 relates to oriented, multilayer polyethylene films. The biaxially oriented, multilayer polyethylene film comprises at least one layer comprising: (1) a polyethylene-based composition that comprises: (a) at least 97% by weight, based on the total weight of the polyethylene-based composition, of a polyethylene composition comprising: (i) from 25 to 37 percent by weight of a first polyethylene fraction having a density in the range of 0.935 to 0.947 $g/cm^3$ and a melt index (I2) of less than 0.1 g/10 minutes; and (ii) from 63 to 75 percent by weight of a second polyethylene fraction; and (b) 20 to 5000 ppm, based on the total weight of the polyethylene-based composition of a nucleating agent, wherein the nucleating agent comprises a calcium salt of 1,2-cyclohexanedicarboxylic acid or sodium 4-[(4-chlorobenzoyl) amino]benzoate; wherein the polyethylene composition has less than 0.10 branches per 1,000 carbon atoms when measured using $^{13}C$ NMR, wherein the density of the polyethylene-based composition is at least 0.965 $g/cm^3$, and wherein the melt index (I2) of the polyethylene-based composition is 0.5 to 10 g/10 minutes.

EP3291960 discloses a method of forming a thermoformed article that may include melt extruding polyethylene to form an extruded sheet. The rheological breadth parameter of the polyethylene may change by no more than about 5% after extrusion relative to the rheological breadth parameter of the polyethylene prior to extrusion. The extruded sheet may be thermoformed within a mold to form the thermoformed article. During thermoforming, the extruded sheet may be subjected to solid-state stretching in one or more directions. The thermoformed article may be retrieved from the mold. The polyethylene may have a rheological breadth parameter of from 0.20 to 0.40, a multimodal molecular weight distribution, a polydispersity (Mw/Mn) of from 5 to 18, a density ranging from 0.940 to 0.970 g/cc, may exhibit tensile strain-hardening, or combinations thereof.

WO2019/241045 relates to a bimodal ethylene-co-1-hexene copolymer consisting essentially of a higher molecular weight component and a lower molecular weight component and, when in melted form at 190 °C, is showing a melt property space defined by a combination of high-load melt index, melt flow ratio, and melt elasticity properties.

It would be desirable to have polyethylene resins, that have good processability into biaxially oriented polyethylene films as well as new biaxially oriented polyethylene films having desired and/or improved properties. It would also be desirable to have polyethylene resins, such as ethylene copolymer resins, that have good processability into biaxially oriented polyethylene films as well as new biaxially oriented polyethylene films having desired and/or improved properties. It would be desirable to find a solution for obtaining a film having an improved stretchability (such as a film that can be processed with a stretch ratio of at least 5.0 in both machine and transverse directions in a large stretching temperature window) while at the same time showing an improved balance of processability, homogeneity and mechanical properties (such as stiffness and/or elongation properties).

The present disclosure aims to provide a solution to one or more of the aforementioned drawbacks and problems. In particular, the present disclosure aims to provide polyethylene resins, such as ethylene homopolymer resins and/or ethylene copolymer resins, suitable for processing into biaxially oriented, multilayer polyethylene films, as well as biaxially oriented, multilayer polyethylene films having desired and/or improved properties. Such polyethylene resins, such as ethylene homopolymer resins and/or ethylene copolymer resins, can advantageously expand the operating temperature window for stretching films to provide biaxially oriented polyethylene films. For example, by expanding the operating temperature window for biaxial orientation, higher density polyethylene can be oriented which can lead to improved film stiffness.

SUMMARY

Surprisingly, it has been found that the above objectives can be attained either individually or in any combination, by the use of a specific polyethylene composition being a polyethylene resin in a biaxially-oriented polyethylene (BOPE) film.

According to a first aspect, the disclosure provides a biaxially-oriented polyethylene (BOPE) film remarkable that it comprises a polyethylene resin having:

- a melt index $MI_2$ ranging from 0.5 to 3.0 g/10 min as determined according to ISO 1133-2005 at 190 °C under a load of 2.16 kg;
- a density of at least 0.950 g/cm$^3$ as determined according to ISO 1183-1:2012 at 23 °C;
- an Mw/Mn of at least 8.0 as determined by gel permeation chromatography;
- a z average molecular weight (Mz) of at least 800,000 g/mol as determined by gel permeation chromatography; and
- an Mz/Mw of at least 6.0 as determined by gel permeation chromatography.

Indeed, as it is demonstrated by the examples the PE resin of the present disclosure has an improved stretchability since it can be processed with a stretch ratio of at least 5.0 in both machine and transverse directions in a large stretching temperature window, while at the same time showing good stiffness properties on the resulting BOPE films.

The Polyethylene Resins

In an embodiment, the polyethylene resin is Ziegler-Natta catalysed. Wherein the polyethylene resin is made with a Ziegler-Natta catalyst, the resulting polyethylene resin contains little or no long chain branches. Thus, the polyethylene resin is substantially free of long-chain branches.

In an embodiment, the polyethylene resin has a bimodal or multimodal molecular weight distribution.

For example, the polyethylene resin, such as the bimodal polyethylene resin, has a melt index $MI_2$ ranging from 0.5 to 3.0 g/10 min as determined according to ISO 1133-2005 at 190 °C under a load of 2.16 kg; preferably, ranging from 0.6 to 2.5 g/10 min; more preferably, ranging from 0.7 to 2.0 g/10 min; and even more preferably, ranging from 0.5 to 1.5 g/10 min.

For example, the polyethylene resin, such as the bimodal polyethylene resin, has a high load melt index HLMI of at least 35 g/10 min as determined according to ISO 1133-2005 at 190 °C under a load of 21.6 kg; preferably, of at least 40 g/10 min; more preferably, of at least 45 g/10 min; even more preferably, of at least 55 g/10 min; and most preferably, of at least 65 g/10 min. For example, the polyethylene resin, such as the bimodal polyethylene resin, has a high load melt index HLMI ranging from 35 g/10 min to 140 g/10 min as determined according to ISO 1133-2005 at 190 °C under a load of 21.6 kg; preferably ranging from 40 g/10 min to 135 g/10 min.

For example, the polyethylene resin, such as the bimodal polyethylene resin, has an HLMI/$MI_2$ ratio of at least 50; preferably, of at least 55; more preferably, of at least 60; more preferably, of at least 62; and even more preferably, of at least 65. For example, the polyethylene resin, such as the bimodal polyethylene resin, has an HLMI/$MI_2$ ratio ranging from 50 to 280.

For example, the polyethylene resin, such as the bimodal polyethylene resin, has a density of at least 0.950 g/cm$^3$ as determined according to ISO 1183-1:2012 at 23 °C; preferably, at least 0.951 g/cm$^3$; more preferably of at least 0.953 g/cm$^3$; even more preferably, of at least 0.955 g/cm$^3$; and most preferably, of at least 0.956 g/cm$^3$. For example, the polyethylene resin, such as the bimodal polyethylene resin, has a density ranging from 0.950 g/cm$^3$ to 0.965 g/cm$^3$ as determined according to ISO 1183-1:2012 at 23 °C, preferably ranging from 0.953 g/cm$^3$ to 0.962 g/cm$^3$.

For example, the polyethylene resin, such as the bimodal polyethylene resin, has an Mw/Mn of at least 8.0 as determined by gel permeation chromatography; preferably, of at least 8.5; more preferably, of at least 9.0; even more preferably of at least 9.2 or at least 9.5; most preferably of at least 10.0; and even most preferably of at least 10.5 or at least 11.0. For example, the polyethylene resin, such as the bimodal polyethylene resin, has an Mw/Mn ranging from 8.0 to 20.0 as determined by gel permeation chromatography; preferably an Mw/Mn ranging from 9.2 to 14.0.

For example, the polyethylene resin, such as the bimodal polyethylene resin, has a z average molecular weight (Mz) of at least 800,000 g/mol as determined by gel permeation chromatography; preferably, of at least 820,000 g/mol or of at least 850,000 g/mol; more preferably, of at least 880,000 g/mol; even more preferably of at least 900,000 g/mol; most preferably of at least 920,000 g/mol; and even most preferably of at least 950,000 g/mol. For example, the polyethylene resin, such as the bimodal polyethylene resin, has a z average molecular weight (Mz) ranging from 800,000 to 2,000,000 g/mol as determined by gel permeation chromatography, preferably ranging from 850,000 to 1,800,000 g/mol.

For example, the polyethylene resin, such as the bimodal polyethylene resin, has an Mz/Mw of at least 6.0 as determined by gel permeation chromatography; preferably, of at least 6.2; more preferably, of at least 6.5; even more preferably of at least 6.8; most preferably of at least 7.0; and even most preferably of at least 7.1. For example, the polyethylene resin, such as the bimodal polyethylene resin, has an Mz/Mw ranging from 6.0 to 12.0 as determined by gel permeation chromatography; preferably, Mz/Mw ranging from 6.5 to 10.0.

The polyethylene resin is selected from an ethylene homopolymer, a copolymer of ethylene with one or more comonomers selected from $C_3$-$C_{20}$ alpha-olefins and any mixture thereof. For example, the polyethylene resin, such as a bimodal polyethylene resin, has a comonomer content of at most 2.5 wt. % or from 0.1 to 2.5 wt. % based on the total weight of the polyethylene resin as determined by $^{13}$C-NMR analysis as defined in the present description.

In an embodiment, the polyethylene resin is selected from an ethylene homopolymer, a copolymer of ethylene with one or more comonomers selected from $C_3$-$C_{20}$ alpha-olefins and any mixture thereof and has a comonomer content of at most 2.5 wt. % or from 0.1 to 2.5 wt. % based on the total weight of the polyethylene resin as determined by $^{13}$C-NMR analysis as defined in the present description.

In an embodiment, the polyethylene resin is an ethylene homopolymer resin, and has a comonomer content of at most 0.2 wt. % based on the total weight of the polyethylene resin as determined by $^{13}$C-NMR analysis as defined in the present description; preferably, of at most 0.1 wt. %; more preferably of at most 0.05 wt. %.

In another embodiment, the polyethylene resin is an ethylene copolymer resin, such as a bimodal ethylene copolymer resin, and has a comonomer content ranging from 0.2 to 2.5 wt. % based on the total weight of the polyethylene resin as determined by $^{13}$C-NMR analysis as defined in the description; preferably, ranging from 0.5 to 2.5 wt. %; more preferably, ranging from 0.6 to 2.2 wt. %; even more preferably, ranging from 0.7 to 2.0 wt. %; and most preferably, ranging from 0.8 to 1.8 wt. %.

For example, the polyethylene resin is an ethylene copolymer resin, such as a bimodal ethylene copolymer resin, with a comonomer content ranging from 0.2 to 2.5 wt. % based on the total weight of the polyethylene resin as determined by $^{13}$C-NMR analysis as defined in the present description and has a one elution peak from 35 to 120 °C in a TREF profile obtained by a TREF analysis as defined in the present description, excluding purge; preferably with a comonomer content ranging from 0.5 to 2.5 wt. %.

For example, the polyethylene resin is an ethylene copolymer resin, such as the bimodal ethylene copolymer resin, with a comonomer content ranging from 0.2 to 2.5 wt. % based on the total weight of the polyethylene resin as determined by $^{13}$C-NMR analysis as defined in the present description, and has a main elution peak above 100 °C in a TREF profile obtained by a TREF analysis as defined in the present description; preferably with a comonomer content ranging from 0.5 to 2.5 wt. %.

For example, the polyethylene resin is an ethylene copolymer resin, such as a bimodal ethylene copolymer resin, and is or comprises a copolymer of ethylene with one or more comonomers selected from the group comprising propylene, butene-1, pentene-1, hexene-1, heptene-1, octene-1, nonene-1, decene-1 and any mixture thereof; with preference, the one or more comonomers are or comprise hexene-1.

For example, the polyethylene resin is a copolymer of ethylene with one or more comonomers selected from the group comprising propylene, butene-1, pentene-1, hexene-1, heptene-1, octene-1, nonene-1, decene-1 and any mixture thereof; with preference, the one or more comonomers are hexene-1.

For example, the polyethylene resin, such as the bimodal polyethylene resin, has a zero-shear viscosity of at least 20 000 Pa·s.

For example, the polyethylene resin, such as the bimodal polyethylene resin, has a melting temperature Tm of at least 125 °C as determined according to ISO 11357-3:2018; preferably of at least 127 °C, more preferably at least 129 °C. The melting temperature Tm of the polyethylene resin is determined on the raw material, i.e., before the film is produced).

In an embodiment, the polyethylene resin, such as the bimodal polyethylene resin, has a density ranging from 0.953 g/cm$^3$ to 0.962 g/cm$^3$ as determined according to ISO 1183-1:2012 at 23 °C; an Mw/Mn ranging from 9.2 to 14.0 as determined by gel permeation chromatography; and an Mz/Mw ranging from 6.5 to 10.0 as determined by gel permeation chromatography.

In an alternative or complementary embodiment, the polyethylene resin has a melt index $MI_2$ ranging from 0.6 to 2.5 g/10 min as determined according to ISO 1133-2005 at 190 °C under a load of 2.16 kg, and a comonomer content of at most 2.5 wt. % based on the total weight of the polyethylene resin as determined by $^{13}$C-NMR analysis as defined in the present description; preferably ranging from 0.1 to 2.5 wt. %

The Biaxially-Oriented Polyethylene Film

In an embodiment, the polyethylene resin, such as a bimodal polyethylene resin, is present in the film at a content of at least 50 wt. % based on the total weight of the biaxially-oriented polyethylene film; preferably, at least 55 wt. % or at least 60 wt. %; more preferably, at least 70 wt. %; even more preferably, at least 80 wt. %; most preferably, at least 90 wt. %; and even most preferably at least 95 wt. % or at least 98 wt. %. In an embodiment, the polyethylene resin is present in the film at a content of 100 wt. % based on the total weight of the biaxially-oriented polyethylene film.

In an embodiment, the polyethylene resin is present in the film at a content ranging from 50 to 100 wt. % based on the total weight of the biaxially-oriented polyethylene film; preferably, from 55 to 98 wt. %; more preferably, from 60 to 95 wt. %; and even more preferably, 70 to 90 wt. %.

For example, the biaxially-oriented polyethylene film has a tensile strength in the machine direction above 120 MPa and a tensile strength in the transverse direction above 130 MPa as determined by ASTM D 882.

For example, the biaxially-oriented polyethylene film has an elastic modulus in the machine direction above 1,050 MPa and an elastic modulus in the transverse direction above 1,200 MPa as determined by ASTM D 882.

In an embodiment, the film is a single-layer film. For example, the film is a single layer film and has a thickness ranging from 10 to 60 μm as determined by DIN ISO 4593; for example, ranging from 20 to 50 μm.

In another embodiment, the film is a multi-layered film; such as a multi-layered film with at least two layers wherein at least one layer comprises or is made of the polyethylene resin; with preference, the film is a coextruded multi-layered film.

For example, the film is a multi-layered film comprising two skin layers, a core layer, and one or more optional intermediate layers placed between a skin layer and the core layer, wherein the polyethylene resin is present in the core layer and optionally is also present in one or more intermediate layers and/or in one or more skin layers.

For example, the film is a multi-layered film wherein one or more layers comprise the polyethylene resin and wherein the film has a thickness ranging from 10 to 60 μm as determined by DIN ISO 4593; for example, ranging from 20 to 50 μm.

According to a second aspect, the disclosure provides a polyethylene resin for the production of a biaxially-oriented polyethylene film according to the first aspect, remarkable in that it has:

- a melt index $MI_2$ ranging from 0.5 to 3.0 g/10 min as determined according to ISO 1133-2005 at 190 °C under a load of 2.16 kg;
- a density of at least 0.950 g/cm$^3$ as determined according to ISO 1183-1:2012 at 23 °C;
- an Mw/Mn of at least 8.0 as determined by gel permeation chromatography;
- a z average molecular weight (Mz) of at least 800,000 g/mol as determined by gel permeation chromatography; and
- an Mz/Mw of at least 6.0 as determined by gel permeation chromatography.

According to a third aspect, the disclosure provides the use of a polyethylene resin for the production of a biaxially-oriented polyethylene film remarkable in that the polyethylene resin is according to the second aspect and/or in that the biaxially-oriented polyethylene film is according to the first aspect.

According to a fourth aspect, the disclosure provides a process to produce a biaxially-oriented polyethylene film according to the first aspect, remarkable in that it comprises the following steps:

a) producing a polyethylene resin having:
   - a melt index $MI_2$ ranging from 0.5 to 3.0 g/10 min as determined according to ISO 1133-2005 at 190 °C under a load of 2.16 kg;
   - a density of at least 0.950 g/cm$^3$ as determined according to ISO 1183-1:2012 at 23 °C;
   - an Mw/Mn of at least 8.0 as determined by gel permeation chromatography;
   - a z average molecular weight (Mz) of at least 800,000 g/mol as determined by gel permeation chromatography; and
   - an Mz/Mw of at least 6.0 as determined by gel permeation chromatography;

b) extruding or casting a film comprising the polyethylene resin;

c) stretching the film in a machine direction and in a transverse direction to produce a biaxially-oriented polyethylene film wherein stretching in the machine direction is at a stretch ratio from 4.5 to 7.0 and stretching in the transverse direction is at a stretch ratio in the range from 6.0 to 10.0; with preference, stretching in the machine direction is at a stretch ratio from 5.0 to 6.0 and/or stretching in the transverse direction is at a stretch ratio in the range from 7.5 to 9.5.

In an embodiment, step b) comprises extruding or casting a film having a thickness ranging from 500 μm to 1 mm as determined by DIN ISO 4593.

In an embodiment, stretching the film in a machine direction and a transverse direction is performed by sequential stretching, wherein stretching is performed in the machine direction flowed by stretching in the transverse direction.

In an embodiment, stretching the film in a machine direction and a transverse direction is performed by simultaneous stretching in both directions.

For example, the film is a single-layer film or a multilayered film so that it comprises one or more layers and the polyethylene resin is present in the film at a content of at least 50 wt. % based on the total weight of the biaxially-oriented polyethylene film; preferably ranging from 55 wt. % to 100 wt. % based on the total weight of the biaxially-oriented polyethylene film.

For example, the polyethylene resin is produced by a slurry process.

For example, the polyethylene resin is an ethylene copolymer resin and the step of producing a polyethylene resin is performed in two slurry loop reactors sequentially connected wherein the one or more comonomers are introduced in the first reactor only.

For example, the step of producing a polyethylene resin is performed in two slurry loop reactors sequentially connected wherein the one or more comonomers are introduced in the first reactor only.

For example, the step of producing a polyethylene resin is performed in two slurry loop reactors sequentially connected defining a first and a second polyethylene fraction wherein the first polyethylene fraction has a density ranging of at least 0.930 g/cm$^3$ according to ISO 1183-1:2012 at 23 °C, and a melt index HL275 ranging from 3.0 g/10 min to 30.0 g/10 min, wherein melt index HL275 is determined in the same way as the HLMI except that the die opening has a diameter 2.75 mm, HL275 can be converted to HLMI using the following equation HLMI=HL275/3.2.

DETAILED DESCRIPTION

Figure 1:
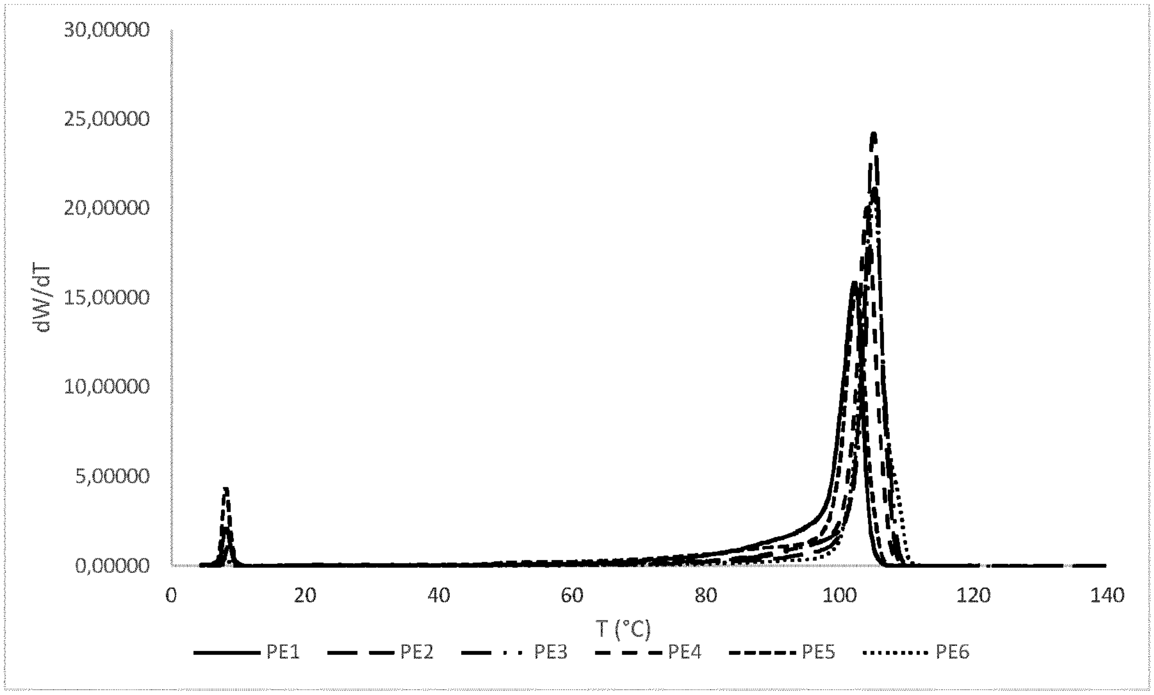
FIG. 1 represents a graph plotting the TREF (temperature rising elution fractionation) profile of resins PE1-PE6.

When describing the polymers, uses and processes of the disclosure, the terms employed are to be construed by the following definitions, unless a context dictates otherwise. For the disclosure, the following definitions are given:

As used herein, the singular forms "a", "an", and "the" include both singular and plural referents unless the context dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all integer numbers and, where appropriate, fractions subsumed within that range (e.g., 1 to 5 can include 1, 2, 3, 4, 5 when referring to, for example, a number of elements, and can also include 1.5, 2, 2.75 and 3.80, when referring to, for example, measurements). The recitation of end points also includes the endpoint values themselves (e.g., from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and form different embodiments, as would be understood by those in the art.

The terms "polyethylene" (PE) and "ethylene polymer" may be used synonymously. The term "polyethylene" encompasses ethylene homopolymer as well as ethylene copolymer resin which can be derived from ethylene and one or more comonomers selected from the group consisting of $C_3$-$C_{20}$ alpha-olefins, such as propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene.

The terms "polyethylene resin" or "ethylene homopolymer resin" or "ethylene copolymer resin" refer to polyethylene fluff or powder that is extruded, and/or melted and/or pelletized and can be produced through compounding and homogenizing of the polyethylene resin as taught herein, for instance, with mixing and/or extruder equipment. As used herein, the term "polyethylene" may be used as a shorthand for "polyethylene resin". The terms "fluff" or "powder" refer to polyethylene material with the hard catalyst particle at the core of each grain and is defined as the polymer material after it exits the polymerization reactor (or the final polymerization reactor in the case of multiple reactors connected in series).

Under normal production conditions in a production plant, it is expected that the melt index (MI2, HLMI, MI5) will be different for the fluff than for the polyethylene resin. Under normal production conditions in a production plant, it is expected that the density will be slightly different for the fluff than for the polyethylene resin. Unless otherwise indicated, density and melt index for the polyethylene resin refer to the density and melt index as measured on the polyethylene resin as defined above.

The present disclosure provides a polyethylene resin for the production of a biaxially-oriented polyethylene film, remarkable in that it has:

- a melt index $MI_2$ ranging from 0.5 to 3.0 g/10 min as determined according to ISO 1133-2005 at 190 °C under a load of 2.16 kg;
- a density of at least 0.950 g/cm$^3$ as determined according to ISO 1183-1:2012 at 23 °C;
- an Mw/Mn of at least 8.0 as determined by gel permeation chromatography;
- a z average molecular weight (Mz) of at least 800,000 g/mol as determined by gel permeation chromatography; and
- an Mz/Mw of at least 6.0 as determined by gel permeation chromatography.

The use of such a polyethylene resin to produce a biaxially-oriented polyethylene (BOPE) film surprisingly results in a film having an improved balance of mechanical properties and processability. Indeed, the polyethylene resin used in the cast film has a good stretchability window. The cast film produced from the polyethylene resin can be stretched in the machine direction (MD) at a stretch ratio from 4.5 to 7.0; with preference from 5.0 to 6.0, and then stretched in the transverse direction (TD) at a stretch ratio from 6.0 to 10.0; with preference from 7.5 to 9.5. At the same time, the film shows a good balance of mechanical properties such as good tensile strength, good elongation at break and good elastic modulus.

The disclosure also provides a process to produce a biaxially-oriented polyethylene film as defined above, remarkable in that comprises the following steps:

a) producing a polyethylene resin having:
   - a melt index $MI_2$ ranging from 0.5 to 3.0 g/10 min as determined according to ISO 1133-2005 at 190 °C under a load of 2.16 kg;
   - a density of at least 0.950 g/cm$^3$ as determined according to ISO 1183-1:2012 at 23 °C;
   - an Mw/Mn of at least 8.0 as determined by gel permeation chromatography;
   - a z average molecular weight (Mz) of at least 800,000 g/mol as determined by gel permeation chromatography; and
   - an Mz/Mw of at least 6.0 as determined by gel permeation chromatography;

b) extruding or casting a film comprising the polyethylene resin;

c) stretching the film in a machine direction and in a transverse direction to produce a biaxially-oriented polyethylene film wherein stretching in the machine direction is at a stretch ratio from 4.5 to 7.0 and stretching in the transverse direction is at a stretch ratio in the range from 6.0 to 10.0. with preference, stretching in the machine direction is at a stretch ratio from 5.0 to 6.0 and/or stretching in the transverse direction is at a stretch ratio in the range from 7.5 to 9.5.

In an embodiment, step b) comprises extruding or casting a film having a thickness ranging from 500 μm to 1 mm as determined by DIN ISO 4593.

In an embodiment, stretching the film in the machine direction and the transverse direction is performed by sequential stretching, wherein stretching is performed in the machine direction flowed by stretching in the transverse direction.

In an embodiment, stretching the film in the machine direction and the transverse direction is performed by simultaneous stretching in both directions.

When a sequential stretching process is used, the stretching/orientation in the machine direction is preferably performed first. The "oriented" sheet was then stretched in the transverse direction. Machine direction orientation (MDO) can be produced using single-stage, or two-stage, Compression Roll Drawing (CRD). The transverse direction orientation (TDO) can be produced in multiple zones: preheat, stretch zone, and annealing, plus one cooling zone. MDO is achieved by pre-heating the base structure and stretching the sheet between two rolls that are turning at different speeds. The difference in the speeds of the rolls determines the stretch ratio. Stretching can be performed in one set of draw rolls or performed over a series of draw rolls. The stretching is generally performed at temperatures below the crystalline melting temperatures of the film (Tm).

The MDO film is fed into the tenter frame oven using clips on chains attached to rails, and pre-heated. The film is stretched as the rails diverge from one another which pull the edges of the film causing the web to stretch. The width of the film is set by the distance between the rails and can be adjusted to achieve the desired stretch ratio. TDO is performed at similar or slightly higher temperatures than MDO.

The film and its process of production will be described jointly.

The Polyethylene Resin Used in the Biaxially-Oriented Polyethylene Film

The disclosure also provides a polyethylene resin for the production of a biaxially-oriented polyethylene film having:

- a melt index $MI_2$ ranging from 0.5 to 3.0 g/10 min as determined according to ISO 1133-2005 at 190 °C under a load of 2.16 kg;
- a density of at least 0.950 g/cm$^3$ as determined according to ISO 1183-1:2012 at 23 °C;
- an Mw/Mn of at least 8.0 as determined by gel permeation chromatography;
- a z average molecular weight (Mz) of at least 800,000 g/mol as determined by gel permeation chromatography; and
- an Mz/Mw of at least 6.0 as determined by gel permeation chromatography.

In an embodiment, the polyethylene resin, such as the bimodal polyethylene resin, has a density ranging from 0.953 g/cm$^3$ to 0.962 g/cm$^3$ as determined according to ISO 1183-1:2012 at 23 °C; an Mw/Mn ranging from 9.2 to 14.0 as determined by gel permeation chromatography; and an Mz/Mw ranging from 6.5 to 10.0 as determined by gel permeation chromatography.

In an alternative or complementary embodiment, the polyethylene resin, such as the bimodal polyethylene resin, has a melt index $MI_2$ ranging from 0.6 to 2.5 g/10 min as determined according to ISO 1133-2005 at 190 °C under a load of 2.16 kg, and a comonomer content of at most 2.5 wt. % based on the total weight of the polyethylene resin as determined by $^{13}$C-NMR analysis as defined in the present description; preferably, ranging from 0.1 to 2.5 wt. %.

Thus, with the combination of the previous embodiments, the present disclosure also provides a polyethylene resin for the production of a biaxially-oriented polyethylene film, remarkable in that it has:

- a melt index $MI_2$ ranging from 0.6 to 2.5 g/10 min as determined according to ISO 1133-2005 at 190 °C under a load of 2.16 kg;
- a density ranging from 0.953 g/cm$^3$ to 0.962 g/cm$^3$ as determined according to ISO 1183-1:2012 at 23 °C;
- an Mw/Mn ranging from 9.2 to 14.0 as determined by gel permeation chromatography;
- a z average molecular weight (Mz) of at least 800,000 g/mol as determined by gel permeation chromatography;
- an Mz/Mw ranging from 6.5 to 10.0 as determined by gel permeation chromatography; and
- a comonomer content of at most 2.5 wt. % based on the total weight of the polyethylene resin as determined by $^{13}$C-NMR analysis as defined in the present description.

The polyethylene resin used in the biaxially-oriented polyethylene film of the disclosure can be further described as below:

In an embodiment, the polyethylene resin is Ziegler-Natta catalysed. Wherein the polyethylene resin is made with a Ziegler-Natta catalyst, the resulting polyethylene resin contains little or no long chain branches. Thus, the polyethylene resin is substantially free of long-chain branches.

The term "Ziegler-Natta catalyst" or "ZN catalyst" refers to catalysts having a general formula $M^1X_v$, wherein $M^1$ is a transition metal compound selected from group IV to VII, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Suitable ZN catalysts for use in the disclosure are described in U.S. Pat. Nos. 6,930,071 and 6,864,207, which are incorporated herein by reference. A preferred Ziegler-Natta catalyst system comprises a titanium compound having at least one titanium-halogen bond and an internal electron donor, both on a suitable support (for example on a magnesium halide in an active form), an organoaluminium compound (such as an aluminium trialkyl), and an optional external electron donor.

The catalyst composition may comprise a co-catalyst. One or more aluminumalkyl represented by the formula $AlR^b_x$ can be used as additional co-catalyst, wherein each Rb is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminums, the most preferred being triisobutylaluminum (TIBAL) and triethylaluminum (TEAL).

All Ziegler-Natta catalysts can be used in the context of the present disclosure. For example, Ziegler-Natta catalysts consisting of magnesium-containing support with a Ti content in the range of from 2 to 25 wt. % are suitable to produce the polyethylene resin.

From the definition given, it is understood that the polyethylene resin has a broad molecular weight distribution with a broadness that can be attainable with a bimodal or multimodal molecular weight distribution. Thus, the polyethylene resin may have a bimodal or multimodal molecular weight distribution.

As used herein, the term "polyethylene with a bimodal molecular weight distribution" or "bimodal polyethylene" or "bimodal polyethylene" refers to polyethylene having a distribution curve being the sum of two unimodal molecular weight distribution curves and refers to a polyethylene product having two distinct but possibly overlapping populations of polyethylene macromolecules each having a different weight average molecular weight. By the expression "polyethylene with a multimodal molecular weight distribution" or "multimodal polyethylene" "multimodal polyethylene" is meant polyethylene with a distribution curve is the sum of at least two, preferably more than two unimodal distribution curves, and refers to a polyethylene product having two or more distinct but possibly overlapping populations of polyethylene macromolecules each having a different weight average molecular weight. The multimodal polyethylene resin can have an "apparent monomodal" molecular weight distribution, which is a molecular weight distribution curve with a single peak and no shoulder. Nevertheless, the polyethylene resin will still be multimodal if it comprises two distinct populations of polyethylene macromolecules each having a different weight average molecular weight, as defined above, for example when the two distinct populations were prepared in different reactors and/or under different conditions.

The polyethylene may be produced by gas, slurry or solution phase process in one or several reactors connected in series. Preferably, the polyethylene is produced in two or more serially connected reactors. Slurry polymerization is preferably used, preferably in a slurry loop reactor or a continuously stirred reactor.

Preferably, the polyethylene is produced in two or more serially connected reactors, comprising at least one first reactor and at least one second reactor, preferably loop reactors, more preferably slurry loop reactors. The polyethylene is produced in at least two serially connected slurry loop reactors, preferably in a double loop reactor.

The polymerization temperature can range from 20 °C to 125 °C, preferably from 55 °C to 105 °C, more preferably from 60 °C to 100 °C and most preferably from 65 °C to 98 °C. Preferably, the temperature range may be within the range from 75 °C to 100 °C and most preferably from 78 °C to 98 °C. The polymerization pressure can range from 2 MPa to 10 MPa, preferably from 3 MPa to 5 MPa, and more preferably from 3.7 MPa to 4.5 MPa.

In a preferred embodiment, the bimodal polyethylene has a first polyethylene fraction (PFA) and a second polyethylene fraction (PFB), each having specific properties.

With preference, the polyethylene is an ethylene copolymer or an ethylene homopolymer and the first polyethylene fraction (PFA) has a melt index HL275 of at least 3.0 g/10 min and of at most 30.0 g/10 min. The melt index HL275 of the first polyethylene fraction is preferably at least 3.5 g/10 min, more preferably at least 4.0 g/10 min, and most preferably at least 4.5 g/10 min. The melt index HL275 of the first polyethylene fraction is preferably at most 20.0 g/10 min; preferably at most 15.0 g/10 min; preferably at most 10.0 g/10 min; preferably at most 9.0 g/10 min.

For example, the polyethylene is an ethylene homopolymer and both the first polyethylene fraction (PFA) and the second polyethylene fraction (PFB) are ethylene homopolymers, essentially without any comonomer. By “essentially without” is meant that no comonomer is intentionally added during the production of the polyethylene fraction, but can nevertheless be present in up to 0.2 wt. %, preferably in up to 0.1 wt. % and most preferably in up to 0.05 wt. %, relative to the total weight of the polyethylene fraction.

For example, the step of producing polyethylene being an ethylene homopolymer resin is performed in two slurry loop reactors sequentially connected defining a first and a second polyethylene fraction wherein the first polyethylene fraction has a density of at least 0.960 g/cm$^3$ according to ISO 1183-1:2012 at 23 °C, and a melt index HL275 ranging from 3.0 g/10 min to 30.0 g/10 min, wherein melt index HL275 is determined in the same way as the HLMI except that the die opening has a diameter 2.75 mm, HL275 can be converted to HLMI using the following equation HLMI=HL275/3.2.

In an embodiment, the polyethylene is an ethylene copolymer and the first polyethylene fraction (PFA) has a density of at least 0.930 g/cm$^3$ preferably at least 0.932 g/cm$^3$, more preferably at least 0.933 g/cm$^3$. The density of the first polyethylene fraction is preferably at most 0.960 g/cm$^3$, more preferably at most 0.958 g/cm$^3$, even more preferably at most 0.956 g/cm$^3$, and most preferably at most 0.955 g/cm$^3$. In an embodiment, the polyethylene is an ethylene copolymer and the first polyethylene fraction (PFA) has a density of at least 0.930 g/cm$^3$ and of at most 0.958 g/cm$^3$.

In the above embodiment, the first polyethylene fraction is essentially a copolymer of ethylene and one or more comonomers, preferably a single comonomer. Preferred comonomers are alpha-olefins having from 3 to 20 carbon atoms or from 3 to 10 carbon atoms. More preferred comonomers are selected from the group comprising propylene, butene-1, pentene-1, hexene-1, heptene-1, octene-1, nonene-1, decene-1 and any mixture thereof. Even more preferred comonomers are selected from the group comprising butene-1, hexene-1, octene-1 and any mixture thereof. The most preferred comonomer is hexene-1.

For example, the step of producing polyethylene being an ethylene copolymer resin is performed in two slurry loop reactors sequentially connected defining a first and a second polyethylene fraction wherein the first polyethylene fraction has a density of at least 0.930 g/cm$^3$ according to ISO 1183-1:2012 at 23 °C, and a melt index HL275 ranging from 3.0 g/10 min to 30.0 g/10 min, wherein melt index HL275 is determined in the same way as the HLMI except that the die opening has a diameter 2.75 mm, HL275 can be converted to HLMI using the following equation HLMI=HL275/3.2.

With preference, the polyethylene is an ethylene copolymer and the second polyethylene fraction (PFB) is an ethylene homopolymer, essentially without any comonomer. By “essentially without” is meant that no comonomer is intentionally added during the production of the second polyethylene fraction, but can nevertheless be present in up to 0.2 wt. %, preferably in up to 0.1 wt. % and most preferably in up to 0.05 wt. %, relative to the total weight of the second polyethylene fraction.

For example, the step of producing a polyethylene resin is performed in two slurry loop reactors sequentially connected wherein the one or more comonomers are introduced in the first reactor only.

The properties of the second polyethylene fraction, particularly its density and melt index, though not particularly limited are chosen such that the properties of the polyethylene resin resulting from blending the first and the second polyethylene fraction are within the limits as defined in this disclosure. While the person skilled in the art knows how to produce a bimodal polyethylene of a given density, $MI_2$ or HLMI, the following equations are given as general guidance:

$$\mathrm{Log}(MI_{2\,BLEND}) = w_{PFA} \times \log(MI_{2\,PFA}) + w_{PFB} \times \log(MI_{2\,PFB}) \quad (1)$$

with $MI_{2\ BLEND}$ being the melt index $MI_2$ of the bimodal polyethylene, $MI_{2\ PFA}$ being the melt index MI2 of the first polyethylene fraction (PFA), $MI_{2\ PFB}$ being the melt index MI2 of the second polyethylene fraction (PFB);

$$\mathrm{Log}(HLMI_{BLEND}) = w_{PFA} \times \log(HLMI_{PFA}) + w_{PFB} \times \log(HLMI_{PFB}) \quad (2)$$

with $HLMI_{BLEND}$ being the high load melt index HLMI of the polyethylene, $HLMI_{PFA}$ being the high load melt index HLMI of the first polyethylene fraction (PFA), $HLMI_{PFB}$ being the high load melt index of the second polyethylene fraction (PFB).

$$D_{BLEND} = w_{PFA} \times D_{PFA} + w_{PFB} \times D_{PFB} \quad (3)$$

$D_{BLEND}$ being the density of the polyethylene, $D_{PFA}$ being the density of the first polyethylene fraction (PFA), $D_{PFB}$ being the density of the second polyethylene fraction (PFB).

In the equations $w_{PFA}$ being the wt. % of the first polyethylene fraction (PFA) and $w_{PFB}$ being the wt. % of the second polyethylene fraction (PFB), relative to the total weight of the bimodal polyethylene.

Preferably, the bimodal polyethylene comprises at least 35 wt. % and at most 55 wt. %, relative to the total weight of said polyethylene, of the first polyethylene fraction. Preferably, the polyethylene comprises at least 40 wt. % of the first polyethylene fraction. Preferably, the polyethylene comprises at most 50 wt. % of the first polyethylene fraction. The second polyethylene fraction is comprised in said polyethylene such that the weight percentages of the first and the second polyethylene fraction, relative to the total weight of the polyethylene, add up to 100.

For example, the polyethylene resin, such as the bimodal polyethylene resin, has a melt index $MI_2$ of at least 0.5 g/10 min as determined according to ISO 1133-2005 at 190 °C under a load of 2.16 kg; preferably, of at least 0.6 g/10 min; and more preferably, of at least 0.7 g/10 min.

For example, the polyethylene resin, such as the bimodal polyethylene resin, has a melt index $MI_2$ of at most 3.0 g/10 min as determined according to ISO 1133-2005 at 190 °C under a load of 2.16 kg; preferably, of at most 2.5 g/10 min; more preferably, of at most 2.0 g/10 min; even more preferably of at most 1.5 g/10 min; most preferably of at most 1.0; g/10 min; and even most preferably of at most 0.9 g/10 min.

For example, the polyethylene resin, such as the bimodal polyethylene resin, has a melt index $MI_2$ ranging from 0.5 to 3.0 g/10 min as determined according to ISO 1133-2005 at 190 °C under a load of 2.16 kg; preferably, ranging from 0.6 to 2.5 g/10 min; more preferably, ranging from 0.7 to 2.0 g/10 min; and even more preferably, ranging from 0.5 to 1.5 g/10 min.

For example, the polyethylene resin, such as the bimodal polyethylene resin, has a high load melt index HLMI of at least 35 g/10 min as determined according to ISO 1133-2005 at 190 °C under a load of 21.6 kg; preferably, of at least 40 g/10 min; more preferably, of at least 45 g/10 min; even more preferably, of at least 55 g/10 min; and most preferably, of at least 65 g/10 min.

For example, the polyethylene resin, such as the bimodal polyethylene resin, has a high load melt index HLMI of at most 140 g/10 min as determined according to ISO 1133-2005 at 190 °C under a load of 21.6 kg; preferably, of at most 135 g/10 min; more preferably, of at most 130 g/10 min; even more preferably, of at most 120 g/10 min; most preferably of at most 110 g/10 min; even most preferably of at most 100 g/10 min; and further even most preferably of at most 90 g/10 min.

For example, the polyethylene resin, such as the bimodal polyethylene resin, has a high load melt index HLMI ranging from 35 to 140 g/10 min as determined according to ISO 1133-2005 at 190 °C under a load of 21.6 kg; preferably, ranging from 40 to 135 g/10 min; more preferably, ranging from 45 to 130 g/10 min; even more preferably, ranging from 55 to 120 g/10 min; and most preferably, ranging from 65 to 110 g/10 min.

For example, the polyethylene resin, such as the bimodal polyethylene resin, has an HLMI/$MI_2$ ratio of at least 50; preferably, of at least 55; more preferably, of at least 60; more preferably, of at least 62; and even more preferably, of at least 65.

For example, the polyethylene resin, such as the bimodal polyethylene resin, has an HLMI/$MI_2$ ratio of at most 280; preferably, of at most 200; more preferably, of at most 180; even more preferably of at most 150; most preferably of at most 120; and even most preferably of at most 100.

For example, the polyethylene resin, such as the bimodal polyethylene resin, has an HLMI/$MI_2$ ratio ranging from 50 to 280; preferably, ranging from 55 to 200; more preferably, ranging from 60 to 180; and even more preferably, ranging from 62 to 150.

For example, the polyethylene resin, such as the bimodal polyethylene resin, has a density of at least 0.950 g/cm$^3$ as determined according to ISO 1183-1:2012 at 23 °C; preferably, at least 0.951 g/cm$^3$; more preferably of at least 0.953 g/cm$^3$; even more preferably, of at least 0.955 g/cm$^3$; and most preferably, of at least 0.956 g/cm$^3$.

For example, the polyethylene resin, such as the bimodal polyethylene resin, has a density of at most 0.965 g/cm$^3$ as determined according to ISO 1183-1:2012 at 23 °C; preferably, of at most 0.962 g/cm$^3$; and more preferably, of at most 0.960 g/cm$^3$; and even more preferably, of at most 0.958 g/cm$^3$.

For example, the polyethylene resin, such as the bimodal polyethylene resin, has a density ranging from 0.950 g/cm$^3$ to 0.965 g/cm$^3$ as determined according to ISO 1183-1:2012 at 23 °C; preferably, ranging from 0.951 g/cm$^3$ to 0.962 g/cm$^3$; more preferably, ranging from 0.953 g/cm$^3$ to 0.962 g/cm$^3$; and even more preferably, ranging from 0.955 g/cm$^3$ to 0.960 g/cm$^3$ or ranging from 0.955 g/cm$^3$ to 0.965 g/cm$^3$ or ranging from 0.956 g/cm$^3$ to 0.965 g/cm$^3$.

For example, the polyethylene resin, such as the bimodal polyethylene resin, has an Mw/Mn of at least 8.0 as determined by gel permeation chromatography; preferably, of at least 8.5; more preferably, of at least 9.0; even more preferably of at least 9.2 or at least 9.5; most preferably of at least 10.0; and even most preferably of at least 10.5 or at least 11.0.

For example, the polyethylene resin, such as the bimodal polyethylene resin, has an Mw/Mn of at most 20.0 as determined by gel permeation chromatography; preferably, of at most 18.0; more preferably, of at most 16.0; even more preferably of at most 15.0; most preferably of at most 14.0; and even most preferably of at most 13.0.

For example, the polyethylene resin, such as the bimodal polyethylene resin, has an Mw/Mn ranging from 8.0 to 20.0 as determined by gel permeation chromatography; preferably, ranging from 8.5 to 18.0; more preferably, ranging from 9.0 to 16.0; and even more preferably, ranging from 9.2 to 14.0.

For example, the polyethylene resin, such as the bimodal polyethylene resin, has a z average molecular weight (Mz) of at least 800,000 g/mol as determined by gel permeation chromatography; preferably, of at least 820,000 g/mol or of at least 850,000 g/mol; more preferably, of at least 880,000 g/mol; even more preferably of at least 900,000 g/mol; most preferably of at least 920,000 g/mol; and even most preferably of at least 950,000 g/mol.

For example, the polyethylene resin, such as the bimodal polyethylene resin, has a z average molecular weight (Mz) of at most 2,000,000 g/mol as determined by gel permeation chromatography; preferably, of at most 1,800,000 g/mol; more preferably, of at most 1,600,000 g/mol; even more preferably of at most 1,400,000 g/mol; most preferably of at most 1,300,000 g/mol; and even most preferably of at most 1,100,000 g/mol.

For example, the polyethylene resin, such as the bimodal polyethylene resin, has a z average molecular weight (Mz) ranging from 800,000 to 2,000,000 g/mol as determined by gel permeation chromatography; preferably, from 820,000 to 2,000,000 g/mol or ranging from 850,000 to 1,800,000 g/mol; more preferably, ranging from 880,000 to 1,600,000 g/mol; and even more preferably, ranging from 920,000 to 1,400,000 g/mol.

For example, the polyethylene resin, such as the bimodal polyethylene resin, has an Mz/Mw of at least 6.0 as determined by gel permeation chromatography; preferably, of at least 6.2; more preferably, of at least 6.5; even more preferably of at least 6.8 or of at least 6.9; most preferably of at least 7.0; and even most preferably of at least 7.1.

For example, the polyethylene resin, such as the bimodal polyethylene resin, has an Mz/Mw of at most 12.0 as determined by gel permeation chromatography; preferably, of at most 11.0; more preferably, of at most 10.0; even more preferably of at most 9.5 or of at most 9.2; most preferably of at most 9.0; and even most preferably of at most 8.0.

For example, the polyethylene resin, such as the bimodal polyethylene resin, has an Mz/Mw ranging from 6.0 to 12.0 as determined by gel permeation chromatography; preferably, ranging from 6.2 to 11.0; more preferably, ranging from 6.5 to 10.0; even more preferably, ranging from 6.8 to 9.5; and most preferably ranging from 6.9 to 9.2.

The polyethylene resin is selected from an ethylene homopolymer resin, a resin of copolymer of ethylene with one or more comonomers selected from $C_3$-$C_{20}$ alpha-olefins (i.e., an ethylene copolymer resin) and any mixture thereof. For example, the polyethylene resin is an ethylene copolymer resin, such as a bimodal polyethylene resin, and has a comonomer content of at most 2.5 wt. % based on the total weight of the polyethylene resin as determined by $^{13}$C-NMR analysis as defined in the present description; preferably, ranging from 0.1 to 2.5 wt. %.

In an example, the polyethylene resin is a homopolymer of ethylene resin. An ethylene homopolymer according to this disclosure has at most 0.2 wt. % or less than 0.2 wt. % of alpha-olefins other than ethylene based on the total weight of said ethylene homopolymer, preferably less than 0.1 wt. %, more preferably less than 0.05 wt. % of alpha-olefins other than ethylene in the polymer. Even most preferably, no other alpha-olefins are detectable. Accordingly, when the polyethylene is a homopolymer of ethylene, the comonomer content in the polyethylene is at most 0.2 wt. % or less than 0.2 wt. %, more preferably, at most 0.1 wt. %, even more preferably, at most 0.05 wt. % based on the total weight of the polyethylene.

In another example, the polyethylene resin is an ethylene copolymer resin, such as the bimodal ethylene copolymer resin, and has a comonomer content of at least 0.2 wt. % based on the total weight of the polyethylene resin as determined by $^{13}$C-NMR analysis as defined in the present description; preferably of at least 0.4 wt. % or at least 0.5 wt. %, more preferably, of at least 0.6 wt. % or at least 0.7 wt. %; even more preferably, of at least 0.8 wt. % or at least 0.9 wt. %; and most preferably, of at least 1.1 wt. %.

For example, the polyethylene resin is an ethylene copolymer resin, such as a bimodal ethylene copolymer resin, and has a comonomer content of at most 2.5 wt. % based on the total weight of the polyethylene resin as determined by $^{13}$C-NMR analysis as defined in the present description; preferably, of at most 2.2 wt. %; more preferably, of at most 2.0 wt. %; even more preferably of at most 1.8 wt. %; most preferably of at most 1.5 wt. %; and even most preferably of at most 1.4 wt. %.

For example, the polyethylene resin is an ethylene copolymer resin, such as a bimodal ethylene copolymer resin, and has a comonomer content ranging from 0.2 to 2.5 wt. % based on the total weight of the polyethylene resin as determined by $^{13}$C-NMR analysis as defined in the present description; preferably, ranging from 0.4 to 2.5 wt. % or from 0.5 to 2.5 wt. %; preferably, ranging from 0.6 to 2.2 wt. %; more preferably, ranging from 0.7 to 2.0 wt. %; and even more preferably, ranging from 0.8 to 1.8 wt. %.

For example, the polyethylene resin is an ethylene copolymer resin, such as a bimodal ethylene copolymer resin, with a comonomer content ranging from 0.2 to 2.5 wt. % based on the total weight of the polyethylene resin as determined by $^{13}$C-NMR analysis as defined in the present description and has one elution peak from 35 to 120 °C in a TREF profile obtained by a TREF analysis as defined in the present description, excluding purge; preferably with a comonomer content ranging from 0.5 to 2.5 wt. %. The polyethylene resin has a single elution peak from 35 to 120 °C in a TREF profile.

For example, the polyethylene resin is an ethylene copolymer resin, such as the bimodal ethylene copolymer resin, with a comonomer content ranging from 0.2 to 2.5 wt. % based on the total weight of the polyethylene resin as determined by $^{13}$C-NMR analysis as defined in the present description and has a main elution peak above 90 °C in a TREF profile obtained by a TREF analysis as defined in the present description; preferably with a comonomer content ranging from 0.5 to 2.5 wt. %. With preference, the polyethylene resin has a main elution peak above 95 °C in a TREF profile, preferably above 100 °C. With preference, the polyethylene resin has one elution peak above 95 °C in a TREF profile, preferably above 100 °C.

For example, the polyethylene resin is an ethylene copolymer resin, such as the bimodal ethylene copolymer resin, with a comonomer content ranging from 0.2 to 2.5 wt. % based on the total weight of the polyethylene resin as determined by $^{11}$C-NMR analysis as defined in the present description and has one elution peak from 35 to 120 °C in a TREF profile obtained by a TREF analysis as defined in the present description, excluding purge and a main elution peak above 90 °C in a TREF profile; preferably with a comonomer content ranging from 0.5 to 2.5 wt. %. With preference, the polyethylene resin has a main elution peak above 95 °C in a TREF profile, preferably above 100 °C. With preference, the polyethylene resin has one elution peak above 95 °C in a TREF profile, preferably above 100 °C.

For example, the polyethylene, such as the bimodal ethylene copolymer resin, is a copolymer of ethylene with one or more comonomers selected from the group comprising propylene, butene-1, pentene-1, hexene-1, heptene-1, octene-1, nonene-1, decene-1 and any mixture thereof; with preference, the one or more comonomers are or comprise hexene-1.

For example, the polyethylene resin, such as the bimodal polyethylene resin, has a zero-shear viscosity of at least 20,000 Pa·s; preferably, at least 22,000 Pa·s; more preferably, at least 24,000 Pa·s; even more preferably, at least 25,000 Pa·s and most preferably, at least 27,000 Pa·s.

It is known to the man skilled in the art that propylene polymers show a non-Newtonian viscosity, i.e., a viscosity changing with the shear rate. The Carreau-Yasuda (CY) model allows an analytical expression of the non-Newtonian viscosity curves. The CY model is a power function of the molecular weight (Mw) and is represented by equation (1):

$$\eta = \eta_0/(1 + (\tau W)^a)^{((1-n)/a)} \quad (1)$$

where:

η=viscosity (Pa·s)

W=shear rate (1/s)

a=rheological breadth parameter [which describes the transition region between the zero-shear-rate region and the power-law region]

τ=relaxation time (s) [which describes the location in time of the transition region]

$\eta_0$=viscosity at zero shear rate (Pa·s) [which defines the Newtonian plateau]

n=power-law constant [which defines the final slope of the high shear rate region]

Rheological breadth refers to the breadth of the transition region between Newtonian and power-law type shear rate for a polymer or the frequency dependence of the viscosity of the polymer. The rheological breadth is a function of the relaxing time distribution of a polymer resin, which in turn is a function of the resin molecular structure of architecture. The rheological breadth may be calculated by fitting the flow curves generated in linear-viscoelastic dynamic oscillatory frequency sweep experiments with a CY model. In the present disclosure, the rheological analysis, such as the zero-shear viscosity determination, were determined at 190 °C.

Details of the significance and interpretation of the CY model and derived parameters may be found in R. B. Bird, R. C. Armstrong and O. Hasseger, Dynamics of polymeric Liquids, Volume 1, page 171-172, Fluid Mechanics, 2$^{nd}$ Edition, John Wiley & Sons (1987), which is incorporated by reference herein.

For example, the polyethylene resin, such as the bimodal polyethylene resin, has a melting temperature Tm of at least 125 °C as determined according to ISO 11357-3:2018; preferably of at least 127 °C, more preferably at least 129 °C. The melting temperature Tm of the polyethylene resin is determined on the raw material, i.e., before the film is produced).

The polyethylene resin according to the disclosure may contain one or more additives such as, by way of example, antioxidants, light stabilizers, acid scavengers, flame retardants, lubricants, antistatic additives, nucleating/clarifying agents, colourants, slip agents, anti-blocking agents, processing aids and any mixture thereof. So that producing a polyethylene resin may comprise blending the polyethylene with one or more additives to obtain an polyethylene resin.

For example, the polyethylene resin according to the disclosure may contain one or more antioxidants such as primary antioxidants and/or secondary antioxidants. It is believed that the one or more antioxidants do not influence the stretching behaviour, nor on final film mechanical properties.

Typical commercial primary antioxidants are hindered phenols and secondary aromatic amines. The most common secondary antioxidants are trivalent phosphorus compounds (phosphites).

In a preferred embodiment, the polyethylene resin comprises from 100 to 5000 ppm of the one or more antioxidants based on the total weight of the polyethylene resin. With preference, the one or more antioxidants comprise at least one phenolic antioxidant and/or at least one organic phosphite or phosphonite antioxidant.

With preference, the polyethylene resin comprises from 100 ppm of the one or more antioxidants based on the total weight of the polyethylene resin; preferably at least 150 ppm, more preferably at least 200 ppm; even more preferably at least 250 ppm and most preferably at least 300 ppm.

With preference, the polyethylene resin comprises from 100 to 5000 ppm of the one or more antioxidants based on the total weight of the polyethylene resin; preferably from 150 to 4000 ppm; more preferably from 200 to 3000 ppm; even more preferably from 250 to 2500 ppm; and most preferably from 300 to 2000 ppm.

In preferred embodiment, the one or more antioxidants are or comprise one or more phenolic antioxidants selected from octadecyl 3-(3,5-di-t-butyl-4-hydroxyphenyl)propionate (CAS number 2082-79-3, Irganox®1076) and/or pentaerythritol-tetrakis(3-(3',5'-di-t-butyl-4-hydroxyphenyl) propionate (CAS 6683-19-8, Irganox®1010).

With preference, the polyethylene resin comprises from 100 ppm of one or more phenolic antioxidants based on the total weight of the polyethylene resin; preferably at least 150 ppm, more preferably at least 200 ppm; even more preferably at least 250 ppm and most preferably at least 300 ppm.

The polyethylene resin comprises from 100 to 5000 ppm based on the total weight of the polyethylene resin of one or more phenolic antioxidants selected from octadecyl 3-(3',5'-di-t-butyl-4-hydroxyphenyl)propionate and/or pentaerythritol-tetrakis(3-(3',5'-di-t-butyl-4-hydroxyphenyl)propionate; preferably from 150 to 4000 ppm; more preferably from 200 to 3000 ppm; even more preferably from 250 to 2500 ppm; and most preferably from 300 to 2000 ppm.

In preferred embodiment, the one or more antioxidants are or comprise at least one organic phosphite or phosphonite antioxidant selected from tris(2,4-ditert-butylphenyl) phosphite (CAS number 31570-04-4, Irgafos® 168), bis(2,4-di-tert.-butyl-6-methylphenyl)-ethyl-phosphite (CAS number 145650-60-8, Irgafos® 38), tris-nonylphenyl phosphite (CAS number 26523-78-4), tetrakis-(2,4-di-t-butylphenyl)-4,4'-biphenyl-di-phosphonite (CAS number 119345-01-6, Irgafos® P-EPQ), 2,4,6-tri-tert-butylphenyl 2-butyl-2-ethyl-1,3-propanediol phosphite (CAS number 161717-32-4, Ultranox® 641) and any mixture thereof.

With preference, the polyethylene resin comprises from 100 ppm of one or more organic phosphite or phosphonite antioxidants based on the total weight of the polyethylene resin; preferably at least 150 ppm, more preferably at least 200 ppm; even more preferably at least 250 ppm and most preferably at least 300 ppm.

The polyethylene resin comprises from 100 to 5000 ppm based on the total weight of the polyethylene resin of one or more organic phosphite or phosphonite antioxidants selected from tris(2,4-ditert-butylphenyl) phosphite (CAS number 31570-04-4, Irgafos®168), bis(2,4-di-tert.-butyl-6-methylphenyl)-ethyl-phosphite (CAS number 145650-60-8, Irgafos® 38), tris-nonylphenyl phosphite (CAS number 26523-78-4), tetrakis-(2,4-di-t-butylphenyl)-4,4'-biphenyl-di-phosphonite (CAS number 119345-01-6, Irgafos® P-EPQ), 2,4,6-tri-tert-butylphenyl 2-butyl-2-ethyl-1,3-propanediol phosphite (CAS number 161717-32-4, Ultranox® 641), or a mixture thereof; preferably from 150 to 4000 ppm; more preferably from 200 to 3000 ppm; even more preferably from 250 to 2500 ppm; and most preferably from 300 to 2000 ppm.

In an embodiment, the one or more antioxidants comprise one or more selected from pentaerythritol tetrakis[3-(3',5'-di-tert-butyl-4'-hydroxyphenyl)propionate]; tris(2,4-ditert-butylphenyl) phosphite and/or octadecyl 3-(3,5-di-tert-butyl-4-hydroxyphenyl)propionate.

In an embodiment, the one or more antioxidants comprise at least two selected from pentaerythritol tetrakis[3-(3',5'-di-tert-butyl-4'-hydroxyphenyl)propionate], tris(2,4-ditert-butylphenyl) phosphite and octadecyl 3-(3,5-di-tert-butyl-4-hydroxyphenyl)propionate.

Pentaerythritol tetrakis[3-(3',5'-di-tert-butyl-4'-hydroxyphenyl)propionate] is commercially available as Irganox® 1010 by BASF. Tris(2,4-ditert-butylphenyl) phosphite is commercially available as Irgafos® 168 by BASF. Octadecyl 3-(3,5-di-tert-butyl-4-hydroxyphenyl)propionate is commercially available as Irganox®1076 by BASF.

For example, the polyethylene resin according to the disclosure may contain one or more acid scavengers. It is believed that the one or more acid scavengers do not influence the stretching behaviour, nor on final film mechanical properties.

With preference, the polyethylene resin comprises from 10 to 5000 ppm based on the total weight of the polyethylene resin of one or more acid scavengers; preferably from 50 to 4000 ppm; more preferably from 100 to 3000 ppm; even more preferably from 200 to 2500 ppm; and most preferably from 300 to 2000 ppm.

With preference, the one or more acid scavengers are selected from calcium oxide, zinc oxide, calcium stearate, magnesium stearate, zinc stearate, sodium stearate, potassium stearate, hydrotalcite and mixtures thereof, preferably selected from calcium stearate, magnesium stearate, zinc stearate, sodium stearate, potassium stearate, and mixtures thereof, more preferably selected from calcium stearate, calcium oxide, zinc oxide and any mixture thereof. With preference, the one or more acid scavengers are or comprise calcium stearate.

For example, the polyethylene resin may contain one or more slip agents. Any slip agent known to a person skilled in the art may be added. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof. For example, the one or more slip agents are selected from polymethylsiloxane, erucamide, oleamide, stearamide, behenamide, stearyl erucamide, behenyl erucamide, methyl erucamide, ethyl erucamide, ethylene-bis-stearamide, ethylene-bis-oleamide and any combination thereof. Non limiting examples of commercially available slip agents have a trade name such as ATMER™ SA from Uniqema, Everberg, Belgium; ARMOSLIP® from Akzo Nobel Polymer Chemicals, Chicago, IL; KEMAMIDE® from Witco, Greenwich, CT; and CRODAMIDE® from Croda, Edison, NJ.

With preference, the polyethylene resin comprises from 10 to 5000 ppm based on the total weight of the polyethylene resin of one or more slip agents; preferably from 50 to 4000 ppm; more preferably from 100 to 3000 ppm; even more preferably from 200 to 2500 ppm; and most preferably from 300 to 2000 ppm.

For example, the polyethylene resin may contain one or more anti-blocking agents. The anti-blocking agent can be used to prevent the undesirable adhesion between touching layers of articles made from the polymer compositions, particularly under moderate pressure and heat during storage, manufacture or use. Any anti-blocking agent known to a person of ordinary skill in the art may be added to the polyethylene resins disclosed herein. Non-limiting examples of anti-blocking agents include minerals (e.g., clays, chalk, and calcium carbonate), synthetic silica gel (e.g., SYLOBLOC® from Grace Davison, Columbia, MD), natural silica (e.g., SUPER FLOSS® from Celite Corporation, Santa Barbara, CA), talc (e.g., OPTIBLOC® from Luzenac, Centennial, CO), zeolites (e.g., SIPERNAT® from Degussa, Parsippany, NJ), aluminosilicates (e.g., SILTON® from Mizusawa Industrial Chemicals, Tokyo, Japan), limestone (e.g., CARBOREX® from Omya, Atlanta, GA), spherical polymeric particles (e.g., EPOSTAR®, poly(methyl methacrylate) particles from Nippon Shokubai, Tokyo, Japan and TOSPEARL®, silicone particles from GE Silicones, Wilton, CT), waxes, amides (e.g. erucamide, oleamide, stearamide, behenamide, ethylene-bis-stearamide, ethylene-bis-oleamide, stearyl erucamide and other slip agents), molecular sieves, and combinations thereof.

With preference, the polyethylene resin comprises from 10 to 5000 ppm based on the total weight of the polyethylene resin of one or more anti-blocking agents; preferably from 50 to 4000 ppm; more preferably from 100 to 3000 ppm; even more preferably from 200 to 2500 ppm; and most preferably from 300 to 2000 ppm.

For example, the polyethylene resin may contain one or more processing aids. For example, the one or more processing aids are selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polyethylene oxide, polysiloxanes, oleamide, stearamide, behenamide, oleyl palmitamide, ethylene bis-oleamide, ethylene bis(stearamide) (EBS) and any mixture thereof With preference, the polyethylene resin comprises from 10 to 5000 ppm based on the total weight of the polyethylene resin of one or more processing aids; preferably from 50 to 4000 ppm; more preferably from 100 to 3000 ppm; even more preferably from 200 to 2500 ppm; and most preferably from 300 to 2000 ppm.

The Biaxially-Oriented Polyethylene Film

In an embodiment, the polyethylene resin, such as the bimodal polyethylene resin, is present in the film at a content of at least 50 wt. % based on the total weight of the biaxially-oriented polyethylene film; preferably, at least 55 wt. % or at least 60 wt. %; more preferably, at least 70 wt. %; even more preferably, at least 80 wt. %; most preferably, at least 90 wt. %; and even most preferably at least 95 wt. % or at least 98 wt. %. In an embodiment, the polyethylene resin is present in the film at a content of 100 wt. % based on the total weight of the biaxially-oriented polyethylene film.

In an embodiment, the polyethylene resin, such as the bimodal polyethylene resin, is present in the film at a content ranging from 50 to 100 wt. % based on the total weight of the biaxially-oriented polyethylene film; preferably, from 55 to 98 wt. %; more preferably, from 60 to 95 wt. %; and even more preferably, from 70 to 90 wt. %.

For example, the film is a single-layer film or a multi-layered film; when the film is a multi-layered film the film is preferably a coextruded multi-layered film.

For example, the film is a single-layer film or a multi-layered film, and the polyethylene resin is present in the film at a content of at least 50 wt. % based on the total weight of the biaxially-oriented polyethylene film; preferably ranging from 55 wt. % to 100 wt. % based on the total weight of the biaxially-oriented polyethylene film.

The biaxially-oriented polyethylene film can be a single layer film or a multi-layer film. When the biaxially-oriented polyethylene film is a multi-layer film, the biaxially-oriented polyethylene film has at least 3 layers; for example, from 3 to 500 layers, preferably from 3 to 50 layers, more preferably from 5 to 15 layers or from 3 to 10 layers.

In an embodiment, the film is a single-layer film. For example, the film is a single layer film and have a thickness ranging from 10 to 60 µm as determined by DIN ISO 4593; for example, ranging from 20 to 50 µm. The film is a single-layer film that comprises or is made of the polyethylene resin.

In another embodiment, the film is a multi-layered film wherein at least one of the layers comprises or is made of the polyethylene resin. The film is a multi-layered film comprising at least two or at least three layers of different material wherein at least one of the layers comprises or is made of the polyethylene resin. For example, the film is a coextruded multi-layered film comprising at least two or at least three coextruded layers of different material wherein at least one of the layers comprises or is made of the polyethylene resin.

For example, the film is a multi-layered film comprising two skin layers and a core layer wherein the polyethylene resin is present at least in the core layer. For example, the core layer consists of the polyethylene resin.

For example, the film is a multi-layered film comprising two skin layers, a core layer, and one or more optional intermediate layers placed between a skin layer and the core layer, wherein the polyethylene resin is present in the core layer and optionally is also present in one or more intermediate layers and/or in one or more skin layers.

For example, the film is a multi-layered film comprising two skin layers, a core layer, and one or more intermediate layers placed between a skin layer and the core layer, wherein the polyethylene resin is present in the core layer and one or more intermediate layers and optionally in one or more skin layers.

For example, the film is a multi-layered film comprising two skin layers, a core layer, and one or more optional intermediate layers placed between a skin layer and the core layer, wherein the polyethylene resin is present in the core layer and one or more skin layers and optionally in one or more intermediate layers.

For example, the film is a multi-layered film comprising two skin layers, a core layer, and one or more intermediate layers placed between a skin layer and the core layer, wherein the polyethylene resin is present in the one or more intermediate layers and optionally in one or more skin layers and/or in the core layer.

For example, the film is a multi-layered film comprising two skin layers, a core layer, and one or more optional intermediate layers placed between a skin layer and the core layer, wherein the polyethylene resin is present in the one or more skin layers and optionally in one or more intermediate layers and/or in the core layer.

For example, the biaxially-oriented polyethylene film has a tensile strength in the machine direction above 120 MPa and tensile strength in the transverse direction above 130 MPa as determined by ASTM D 882.

For example, the biaxially-oriented polyethylene film has an elastic modulus in the machine direction above 1,050 MPa and an elastic modulus in the transverse direction above 1,200 MPa as determined by ASTM D 882. This can be achieved upon sequential in the machine direction and transverse direction or upon simultaneous stretching in both directions. Simultaneous stretching in both machine and transversal directions can be performed in a Karo stretcher. Sequential stretching in machine direction followed by transversal direction can be performed on a tenter frame. Suitable elastic modulus in the machine direction and/or in the transverse direction can be improved with an increase of the stretch ratio in the given direction. A further improvement in elastic modulus can be obtained with an increase in the density of the polyethylene resin used; for example, up to 0.965 g/cm$^3$ as determined according to ISO 1183-1:2012 at 23 °C. For example, when polyethylene resin has a density ranging from 0.953 g/cm$^3$ to 0.965 g/cm$^3$, preferably ranging from 0.954 g/cm$^3$ to 0.965 g/cm$^3$, more preferably ranging from 0.955 g/cm$^3$ to 0.965 g/cm$^3$.

For example, with a stretch ratio of 6.0 in both MD and TD upon simultaneous stretching in both machine and transversal directions, the biaxially-oriented polyethylene film has an elastic modulus in the machine direction above 1,500 MPa and an elastic modulus in the transverse direction above 1,500 MPa as determined by ASTM D 882. Simultaneous stretching in both machine and transversal directions can be performed in a Karo stretcher. Sequential stretching in machine direction followed by transversal direction can be performed on a tenter frame.

For example, the film is a multi-layered film wherein one or more layers comprise the polyethylene resin and wherein the film has a thickness ranging from 10 to 60 µm as determined by DIN ISO 4593; for example, ranging from 20 to 50 µm.

Test Methods

The melt flow index $MI_2$ of the polyethylene resin is determined according to ISO 1133-2005 at 190 °C under a load of 2.16 kg.

The HLMI of the polyethylene resin is determined according to ISO 1133-2005 at 190 °C under a load of 21.6 kg.

The Mn, Mw, Mz, Mw/Mn and Mz/Mw: The molecular weight (Mn (number average molecular weight), M, (weight average molecular weight) and molecular weight distributions D (Mw/Mn) were determined by size exclusion chromatography (SEC) and in particular by gel permeation chromatography (GPC). Briefly, a GPC-IR5 from Polymer Char was used: 10 mg polyethylene sample was dissolved at 160 °C in 10 ml of trichlorobenzene for 1 hour. Injection volume: about 400 µl, automatic sample preparation and injection temperature: 160 °C. Column temperature: 145 °C. Detector temperature: 160 °C. Two Shodex AT-806MS (Showa Denko) and one Styragel HT6E (Waters) columns were used with a flow rate of 1 ml/min (eluent: trichlorobenzene). Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})=0.965909\times\log_{10}(M_{PS})-0.28264$) (cut off on the low molecular weight end at $M_{PE}=1000$).

The molecular weight averages used in establishing molecular weight/property relationships are the number average ($M_n$), weight average ($M_w$) and z average ($M_z$) molecular weight. These averages are defined by the following expressions and are determined from the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

-continued $$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight $M_i$. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The molecular weight distribution (MWD) is then calculated as Mw/Mn.

The $^{13}$C-NMR analysis is performed using a 400 MHz or 500 MHz Bruker NMR spectrometer under conditions such that the signal intensity in the spectrum is directly proportional to the total number of contributing carbon atoms in the sample. Such conditions are well-known to the skilled person and include, for example, sufficient relaxation time etc. In practice, the intensity of a signal is obtained from its integral, i.e., the corresponding area. The data are acquired using proton decoupling, 2000 to 4000 scans per spectrum with 10 mm room temperature through or 240 scans per spectrum with a 10 mm cryoprobe, a pulse repetition delay of 11 seconds and a spectral width of 25000 Hz (+/−3000 Hz). The sample is prepared by dissolving a sufficient amount of polymer in 1,2,4-trichlorobenzene (TCB, 99%, spectroscopic grade) at 130 °C and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as an internal standard. To give an example, about 200 mg to 600 mg of polymer is dissolved in 2.0 mL of TCB, followed by the addition of 0.5 mL of $C_6D_6$ and 2 to 3 drops of HMDS.

Following data acquisition, the chemical shifts are referenced to the signal of the internal standard HMDS, which is assigned a value of 2.03 ppm.

The comonomer content in polyethylene is determined by $^{13}$C-NMR analysis of pellets according to the method described by G. J. Ray et al. (*Macromolecules,* 1977, 10, (4), 773-778).

Crystallisation temperature (Tc) and Melting temperature (Tm) is determined according to ISO 11357-3:2018 on a DSC Q2000 instrument by TA Instruments. To erase the thermal history the samples are first heated to 220 °C and kept at 220 °C for 3 minutes. Then the polymer is cooled at −20 °C/min. up to 20 °C and kept at 20 °C for 3 minutes. The crystallization temperature is determined during this cooling step. The crystallization temperature Tc corresponds to the temperature of the extremum of the spectrogram presenting the heat flux associated with the polymer as a function of the temperature during its cooling. The polymer is then melted up to 220 °C at 20 °C/min. and the melting temperature is determined during this heating step. The melting temperature corresponds to the temperature of the extremum of the spectrogram presenting the heat flux associated with the polymer as a function of the temperature during its melting.

The density was measured according to the method of standard ISO 1183-1:2012 (immersion method) at a temperature of 23 °C.

Thickness of the films was determined according to DIN ISO 4593.

Mechanical properties of the films were determined according to ASTM D 882.

Zero-Shear Viscosity:

The zero shear viscosities are obtained by means of a Frequency Sweep test (from 0.1 to 300 rad/s, with a strain of 10%) which were carried out in a controlled tension rheometer ARES-G2 (TA Instruments, New Castle, Del) using parallel plates of 25 mm diameter at 190 °C. The rheometer oven is set to the test temperature for at least 30 minutes before zero values are set. At the test temperature, a sample disk molded by compression is inserted between the plates and allowed to reach equilibrium when the normal force reaches a value below 100 gm.

The upper plate is then lowered to 20 µm above the desired test gap (2.00 mm). Any superfluous material is trimmed and the top plate is lowered to the desired spacing. The measurements are carried out under nitrogen purge at a flow rate of 10 l/minute (0.6 MPa).

Haze was determined according to BS ISO 14782:2021

Gloss was determined according to ASTM D2457-21

TREF

Temperature Rising Elution Fractionation analysis (TREF analysis) was performed using the method similar to as described in Soares and Hamielec, Polymer, 36 (10), 1995 1639-1654, incorporated herein in its entirety by reference. The TREF analysis was performed on a TREF model 200 TF series instrument equipped with Infrared detector from Polymer Char, (Valencia, Spain). The samples were dissolved in 1,2-dichlorobenzene at 150 °C for 1 h. The following parameters as shown in the below Table were used.

| METHOD INFORMATION | |
|---|---|
| Dissolution Rate(°C/min) | 20 |
| Stabilization Rate(°C/min) | 20 |
| Crystallization Rate 1(°C/min) | 0.5 |
| Elution Rate (°C/min) | 3 |
| Cleaning rate (°C/min) | 30 |
| Dissolution temperature (°C) | 150 |
| Stabilization temperature (°C) | 95 |
| Crystallization temperature (°C) | 35 |
| Elution init temp (°C) | 35 |
| Elution temperature (°C) | 120 |
| Post elution temperature (°C) | 150 |
| Cleaning temperature (°C) | 150 |
| Dissolution time (min) | 60 |
| Stabilization time (min) | 45 |
| Crystallization time (min) | 10 |
| Pre-injection time (min) | 10 |
| Soluble Fraction time (min) | 10 |
| post elution time (min) | 10 |
| Cleaning time (min) | 30 |
| Cleaning cycles | 1 |
| High rpm | 200 |
| Low rpm | 100 |
| T on | 5 |
| T off (s) | 120 |
| Dissolution stirring | High |
| Stabilization stirring | High |
| Cleaning stirring | High |
| Filling vessels volume (mL) | 20 |
| Filling vessels pick up speed (mL/min) | 40 |
| Filling vessels pump speed (mL/min) | 15 |
| Analysis discarded sample volume (mL) | 2 |
| Analysis discarded waste volume (mL) | 6 |
| Analysis sample volume (mL) | 0.3 |
| Column load volume (mL) | 1.9 |
| Analysis waste volume (mL) | 5 |
| Analysis returned volume (mL) | 1 |
| Analysis pick up rate (mL/min) | 8 |
| Analysis dispensing rate (mL/min) | 3 |
| Cleaning volume (mL) | 30 |
| Cleaning pick up speed (mL/min) | 40 |
| Cleaning pump speed (mL/min) | 15 |
| Top oven temperature (°C) | 140 |
| Pump Flow (mL/min) | 1.5 |

EXAMPLES

The following non-limiting examples illustrate the disclosure.

Example 1—Preparation of the Polyethylene Resin

PE1 to PE6 polyethylene resins were produced using a Ziegler-Natta catalyst in two sequentially connected slurry loop reactors. TEAL was used as a co-catalyst for PE1 to PE6 (50 ppm in each reactor). Additional polymerization conditions are indicated in table 1.

TABLE 1

| polymerisation conditions | | | | | | | |
|---|---|---|---|---|---|---|---|
| | | PE1 | PE2 | PE3 | PE4 | PE5 | PE6 |
| First reactor | | | | | | | |
| TEMP. | °C | 90 | 95 | 95 | 95 | 90 | 83 |
| C2- | (kg/h) | 19 | 22 | 23 | 25 | 22 | 22 |
| C6- | (kg/h) | 1.55 | 0.23 | 0 | 0 | 0.35 | 3.0 |
| H2 | (Nl/h) | 11 | 75 | 50 | 102 | 44 | 60 |
| IC4 | (kg/h) | 65 | 55 | 55 | 55 | 55 | 55 |
| C2- OG | (wt. %) | 0.76 | 1.1 | 0.72 | 1.8 | 0.69 | 0.60 |
| C6- OG | (wt. %) | 1.5 | 0.20 | 0.04 | 0.04 | 0.23 | 2.1 |
| H2 OG | (vol. %) | 0.01 | 0.16 | 0.09 | 0.25 | 0.07 | 0.1 |
| C6-/C2- OG | | 2.0 | 0.18 | 0.06 | 0.33 | 0.2 | 3.5 |
| H2/C2- OG | | 0.02 | 0.14 | 0.12 | 0.10 | 0.14 | 0.16 |
| contribution | (wt. %) | 43 | 50 | 50 | 51 | 50 | 50 |
| residence time | (min) | 54 | 60 | 60 | 58 | 60 | 58 |
| MI2 | (gr/10') | — | 1.9 | 0.61 | 0.82 | 0.42 | 2.5 |
| HLMI | (gr/10') | 1.6 (calculated) | 72 | 27 | 25 | 18 | 89 |
| HL275 | (gr/10') | 5.1 | — | — | — | — | — |
| DENSITY | (g/cm$^3$) | 0.9339 | 0.9592 | 0.9599 | 0.9608 | 0.9526 | 0.9370 |
| Second reactor | | | | | | | |
| TEMP. | (° C.) | 95 | 95 | 95 | 95 | 90 | 83 |
| C2- | (kg/h) | 30 | 23 | 23 | 25 | 23 | 25 |
| C6- | (kg/h) | 0 | 0.45 | 1.0 | 0 | 1.6 | 4.5 |
| H2 | (Nl/h) | 1549 | 145 | 184 | 127 | 225 | 150 |
| IC4 | (kg/h) | 45 | 45 | 45 | 45 | 45 | 45 |
| C2- OG | (wt. %) | 4.5 | 2.1 | 1.1 | 2.9 | 1.5 | 1.9 |
| C6- OG | (wt. %) | 0.95 | 0.51 | 0.79 | 0 | 1.5 | 5.4 |
| H2 OG | (vol. %) | 2.8 | 0.32 | 0.33 | 0.37 | 0.30 | 0.23 |
| C6-/C2- OG | | 0.21 | 0.24 | 0.72 | 1 | 0 | 2.9 |
| H2/C2- OG | | 0.62 | 0.15 | 0.30 | 0.20 | 0.13 | 0.12 |
| residence time | (min) | 32 | 34 | 33 | 34 | 34 | 34 |

OG = Off Gas

The fluff polymers were pelletized to form resins The properties of the resins produced are reported in table 2. FIG. 1 reports the TREF analysis.

TABLE 2

| Resins properties-pellets analysis | | | | | | | |
|---|---|---|---|---|---|---|---|
| Resin | | PE1 | PE2 | PE3 | PE4 | PE5 | PE6 |
| MI2 | (g/10') | 0.77 | 2.0 | 2.3 | 1.9 | 2.6 | 0.69 |
| MI5 | (g/10') | — | 6.5 | 8.5 | 6.4 | 8.2 | — |
| HLMI | (g/10') | 69 | 79 | 107 | 76 | 86 | — |
| Density | (g/cm$^3$) | 0.956 | 0.961 | 0.963 | 0.956 | 0.942 | 0.960 |
| Mn | (Da) | 10923 | 17884 | 14636 | 14946 | 16522 | 21800 |
| Mw | (Da) | 136631 | 95127 | 93110 | 102301 | 97260 | 126362 |
| Mz | (Da) | 974981 | 488733 | 585671 | 660124 | 581636 | 706958 |
| Mw/Mn | | 12.5 | 5.3 | 6.4 | 6.8 | 5.9 | 5.8 |
| Mz/Mw | | 7.1 | 5.1 | 6.3 | 6.5 | 6.0 | 5.6 |
| C6 (NMR) | (wt. %) | 1.2 | 0.3 | 0.6 | 1.0 | 4.1 | 0 |

TABLE 2-continued

| Resins properties-pellets analysis | | | | | | | |
|---|---|---|---|---|---|---|---|
| Resin | | PE1 | PE2 | PE3 | PE4 | PE5 | PE6 |
| Melting point (DSC) | °C | 129.8 | 132.3 | 132.4 | 130.9 | 127.8 | 133.6 |
| CY_C1 ($\eta_0$) | Pa · s | 29 050 | 7 237 | 7 287 | 9 918 | 6 361 | 24 009 |
| CY_C2 ($\lambda$) | | 0.222 | 0.004 | 0.004 | 0.005 | 0.003 | 0.010 |
| CY_C3 (CY-a) | | 0.31 | 0.28 | 0.25 | 0.25 | 0.27 | 0.26 |
| CY_C4 (n) | | 0.197801 | 0 | 0 | 0 | 0 | 0 |

($\lambda$) (CY_C2) is the CY relaxation parameter.

Example 2—Preparation of the Biaxially-Oriented Polyethylene Films

Single-layer cast films comprising 100 wt. % of the polyethylene resins have been produced.

In a first step, cast film rolls were produced on a laboratory cast film extrusion line (at Bruckner Maschinenbau in Siegsdorf, Germany), with a thickness of 720 to 750 microns. Then, square samples of 80*80 mm were cut from the cast film rolls and were stretched in a Karo lab stretcher (at Bruckner Maschinenbau in Siegsdorf, Germany) according to the conditions set in table 3.

TABLE 3

| stretching conditions. | | | | | | |
|---|---|---|---|---|---|---|
| Product name | Initial thickness (microns) | Initial dimension (mm) | Oven temperature (°C) | Preheating time (s) | Stretching speed (%) (constant speed) | stretch ratio achieved without film break (simultaneous MD/TD) |
| PE6 | 720 | 80*80 | 125 | 120 | 300 | 3.0 * 3.0 |
| PE6 | 720 | 80*80 | 128 | 120 | 300 | 4.0 * 4.0 |
| PE6 | 720 | 80*80 | 130 | 120 | 300 | 5.0 * 5.0 |
| PE6 | 720 | 80*80 | 132 | 120 | 300 | FAIL |
| PE2 | 750 | 80*80 | 125 | 120 | 300 | 3.0 * 3.0 |
| PE2 | 750 | 80*80 | 128 | 120 | 300 | 4.0 * 4.0 |
| PE2 | 750 | 80*80 | 130 | 120 | 300 | FAIL |
| PE3 | 750 | 80*80 | 125 | 120 | 300 | 4.0 * 4.0 |
| PE3 | 750 | 80*80 | 128 | 120 | 300 | 5.5 * 5.5 |
| PE3 | 750 | 80*80 | 130 | 120 | 300 | FAIL |
| PE4 | 750 | 80*80 | 125 | 120 | 300 | 5.0 * 5.0 |
| PE4 | 750 | 80*80 | 128 | 120 | 300 | 9.0 * 9.0 |
| PE5 | 750 | 80*80 | 115 | 120 | 300 | 3.5 * 3.5 |
| PE5 | 750 | 80*80 | 120 | 120 | 300 | 6.5 * 6.5 |
| PE5 | 750 | 80*80 | 125 | 120 | 300 | 7.5 * 7.5 |
| PE1 | 780 | 80*80 | 120 | 120 | 300 | 6.0 * 6.0 |
| PE1 | 780 | 80*80 | 123 | 120 | 300 | 6.0 * 6.0 |
| PE1 | 780 | 80*80 | 126 | 120 | 300 | 6.5 * 6.5 |
| PE1 | 780 | 80*80 | 127.5 | 120 | 300 | 6.5 * 6.5 |

Figure 4:
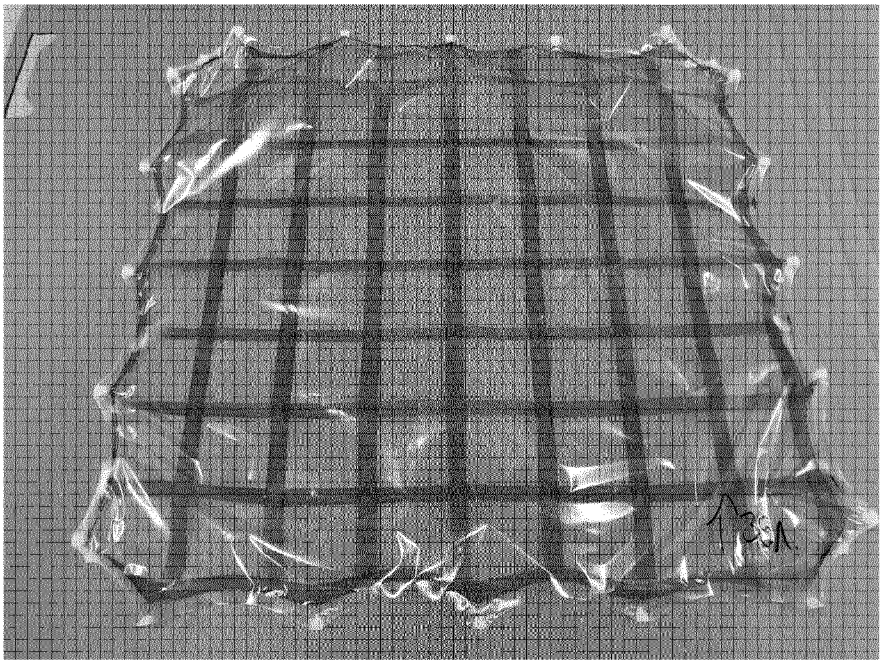
FIG. 4 is a picture of the film made of PE1 stretched at a stretch ratio of 6.5 in both MD and TD for visual assessment of homogeneity.
Figure 5:
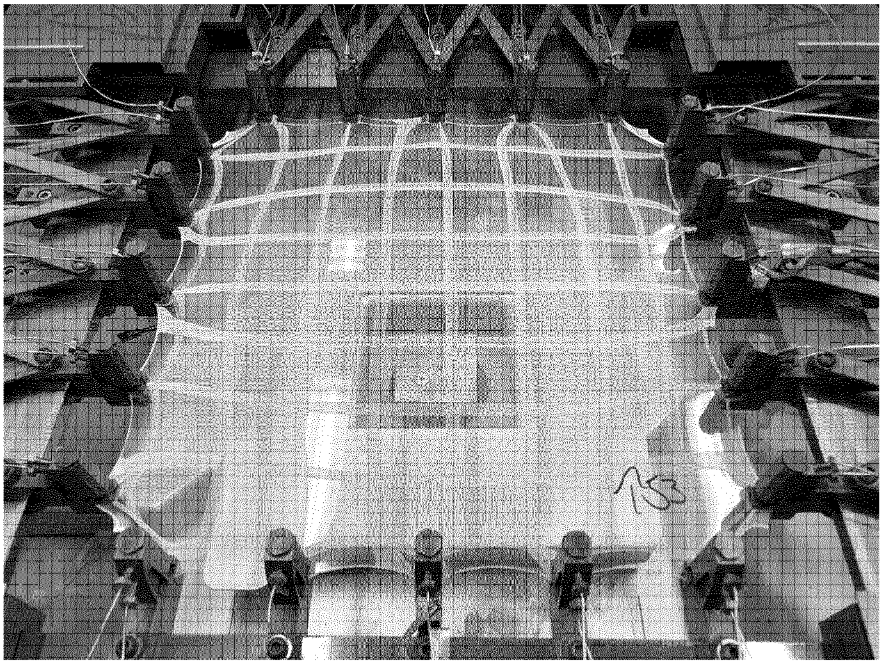
FIG. 5 is a picture of the film made of PE2 stretched at a stretch ratio of 4.0 in both MD and TD for visual assessment of homogeneity.
Figure 6:
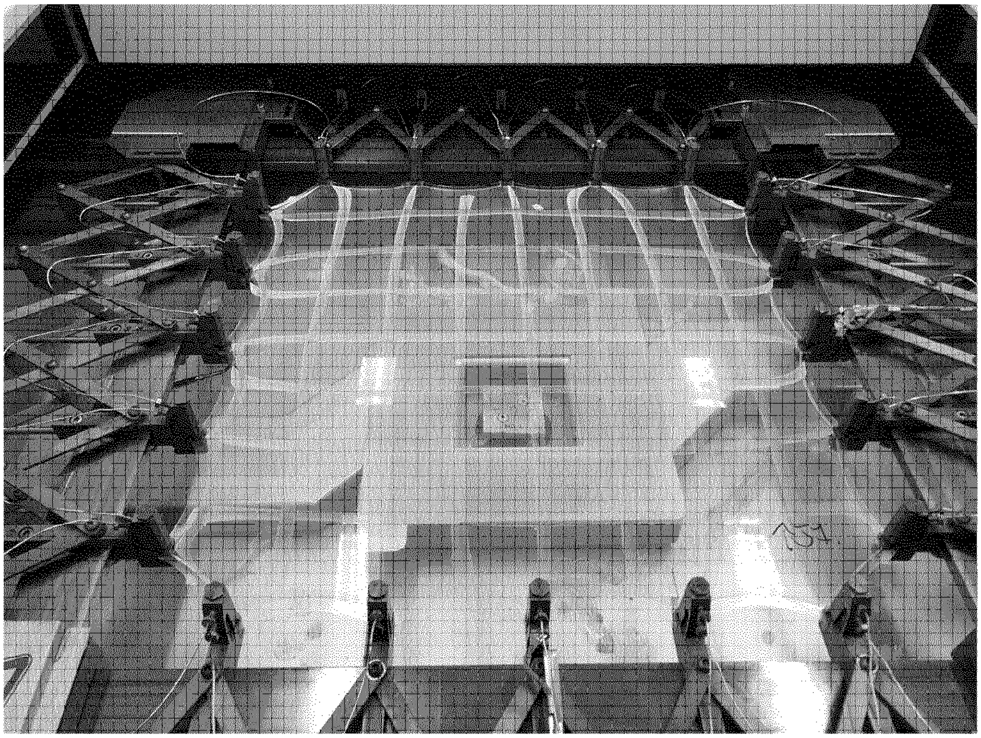
FIG. 6 is a picture of the film made of PE3 stretched at a stretch ratio of 6.0 in both MD and TD for visual assessment of homogeneity.
Figure 7:
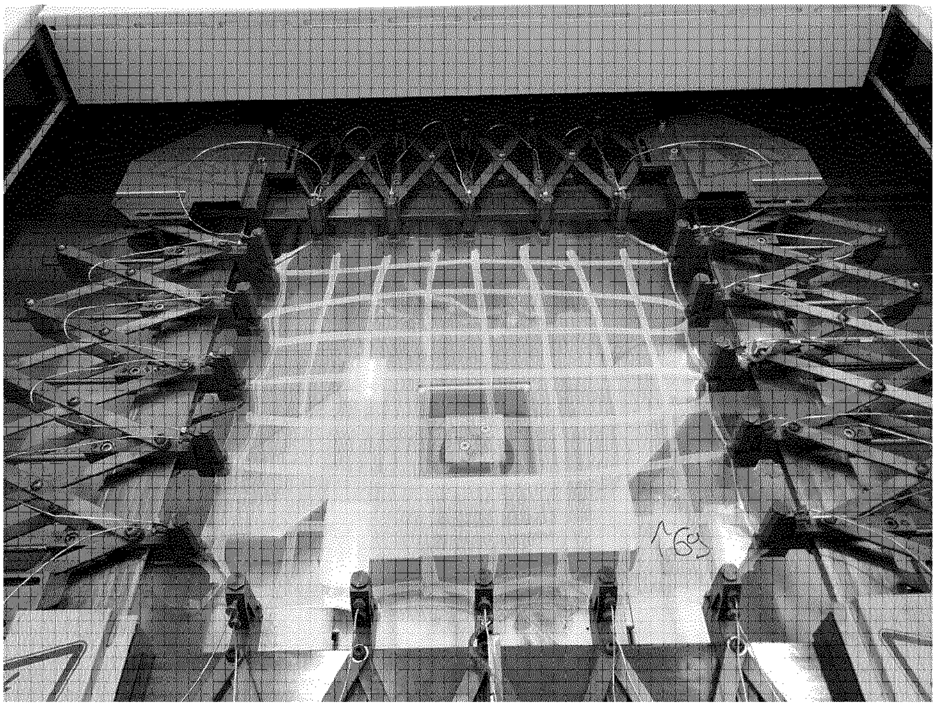
FIG. 7 is a picture of the film made of PE4 stretched at a stretch ratio of 5.0 in both MD and TD for visual assessment of homogeneity.
Figure 8:
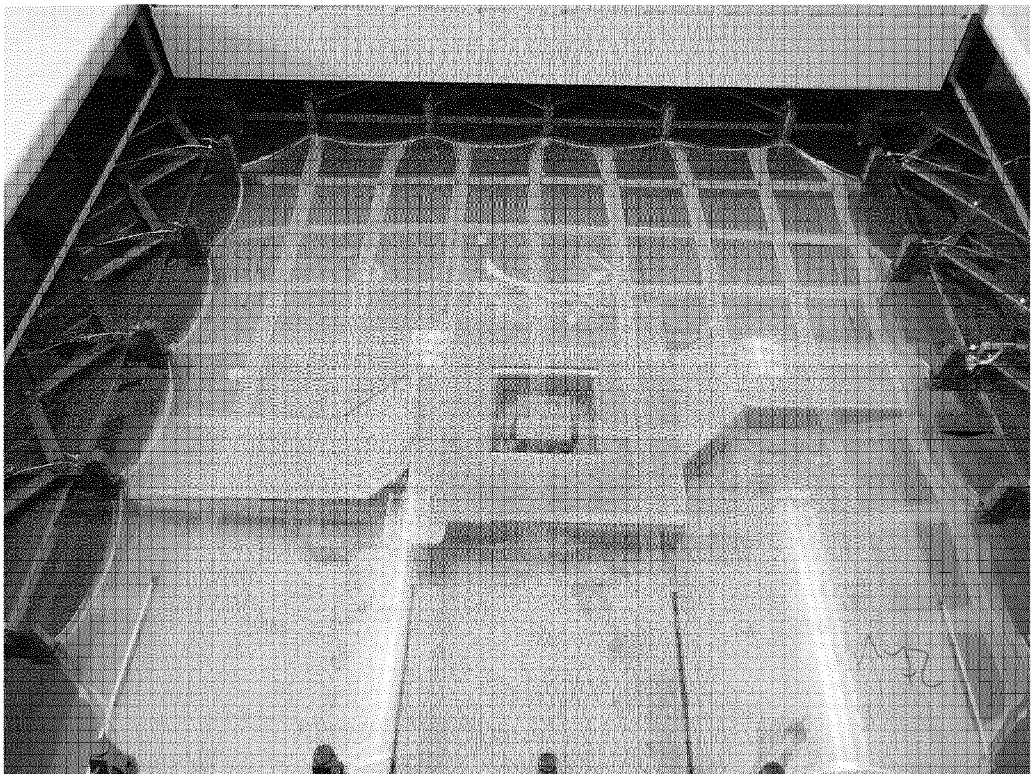
FIG. 8 is a picture of the film made of PE4 stretched at a stretch ratio of 9.0 in both MD and TD for visual assessment of homogeneity.
Figure 9:
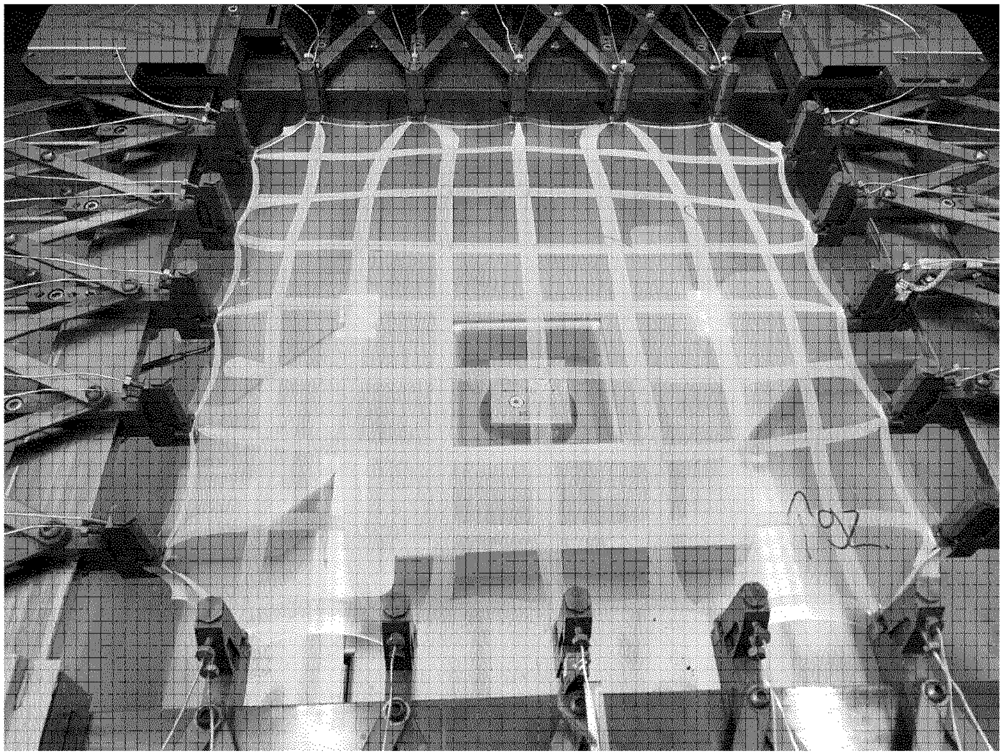
FIG. 9 is a picture of the film made of PE6 stretched at a stretch ratio of 5.0 in both MD and TD for visual assessment of homogeneity.

Products PE2, PE3 and PE6 did not allow to reach satisfactory stretch ratios (all remained below 6.0×6.0) and suffered from inhomogeneous stretching (resulting logically in inhomogeneous thicknesses) as illustrated in FIGS. 5, 6 and 9. Product PE4 allows to reach a satisfactory stretch ratio (i.e., equal or above 6.0×6.0) but within a too narrow temperature range and with poor to medium stretching homogeneity (see FIGS. 7 and 8). Product PE allows to reach satisfactory stretch ratios over a wider temperature window but shows a relatively low elastic modulus (see table 4). Only PE1 allows to obtain good stretch ratios over a broad range of stretching temperatures, with a homogenous stretching (see FIG. 4) and high film elastic modulus (see table 4).

Figure 2:
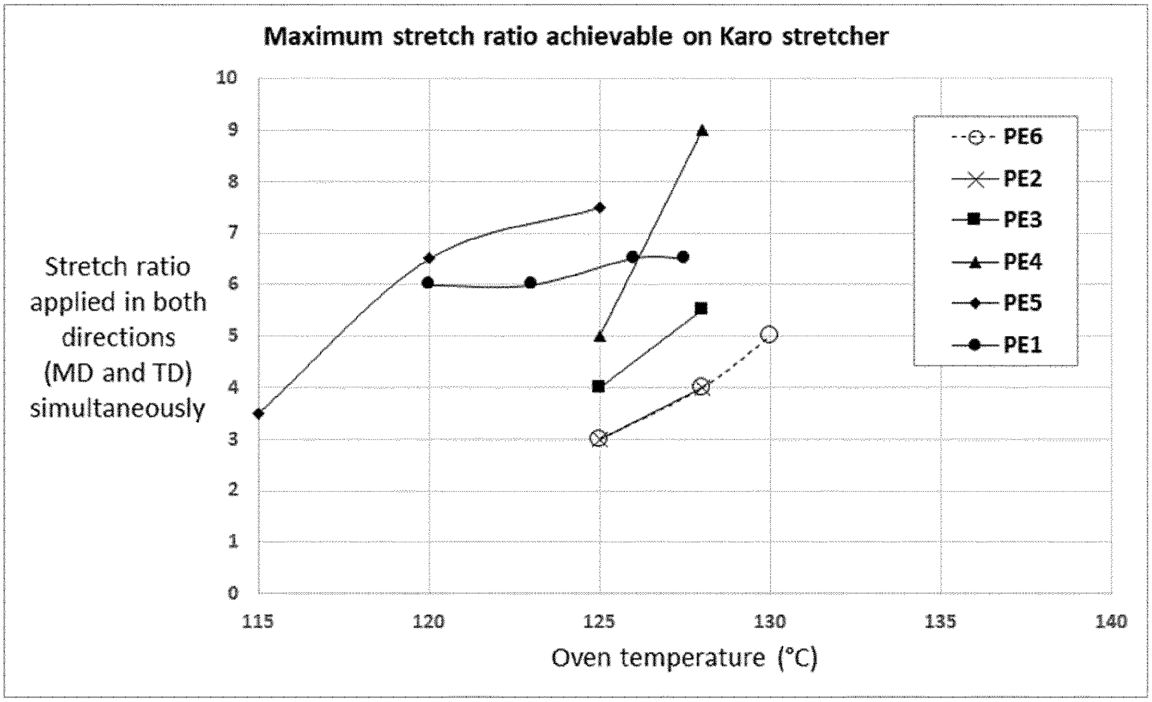
FIG. 2 is a chart representing the highest stretch ratio achieved without film break (or film melting) as a function of the Karo stretcher oven temperature. Stretching experiments were performed in both directions simultaneously and at the same stretching speed, so that the ordinate axis represents the stretch ratio applied in both directions (for example, ordinate 6 means an MD stretch ratio of 6 and a TD stretch ratio of 6, which may also be noted 6*6 like in Table 3).
Figure 3:
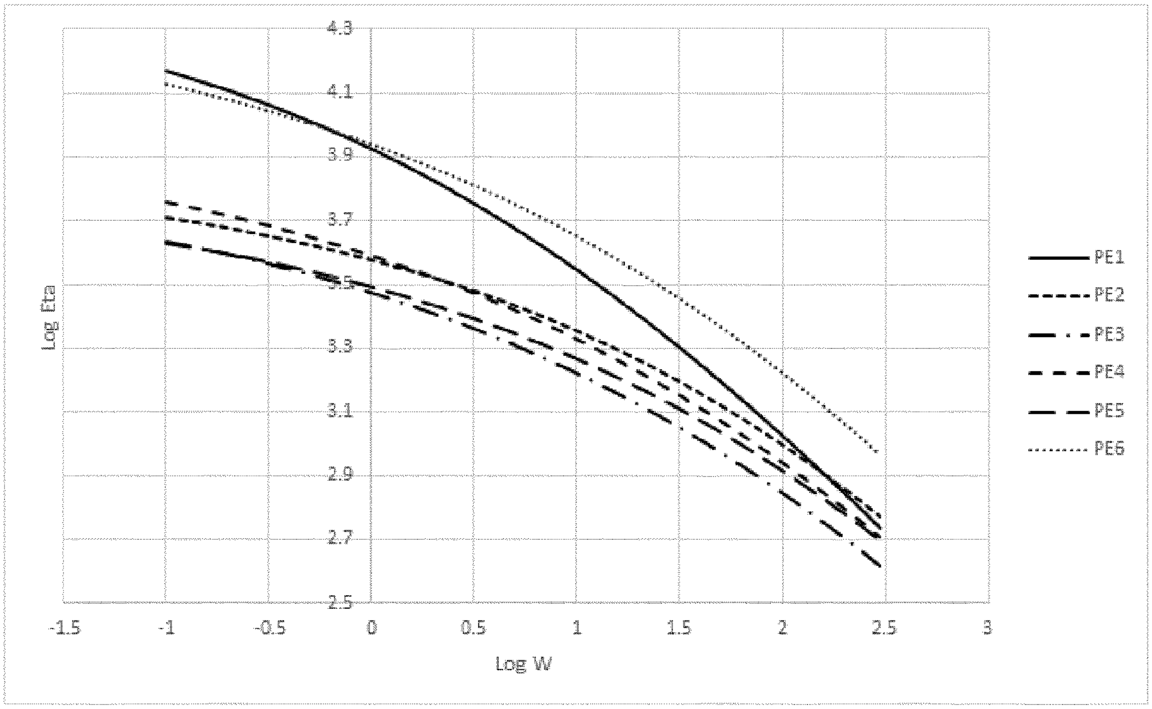
FIG. 3 is a graph plotting the Frequency Sweep test curve for the resins PE1 to PE6 determined at 190 °C.

The properties of the films made from PE4, PE5 and PE1 have been analysed and reported in table 4 and FIG. 2.

The thickness of the films was determined according to DIN ISO 4593

TABLE 4

| properties of the films | | | | | | |
|---|---|---|---|---|---|---|
| Resin | | PE4 | PE5 | PE1 | | |
| Karo stretcher settings | | | | | | |
| Stretching temperature | (°C) | 125 | 120 | 120 | 123 | 126 |

TABLE 4-continued

| properties of the films | | | | | | |
|---|---|---|---|---|---|---|
| Resin | | PE4 | PE5 | | PE1 | |
| Stretch ratio MD | | 5.0 | 6.5 | 6.0 | 6.0 | 6.5 |
| Stretch ratio TD | | 5.0 | 6.5 | 6.0 | 6.0 | 6.5 |
| Analyses on biaxially oriented film Thickness | | | | | | |
| Average | (microns) | n.d. | n.d. | 26 | 24.7 | 19.9 |
| Standard deviation | (microns) | n.d. | n.d. | 1 | 1 | 0.7 |
| Tensile strength at break MD | (MPa) | 140 | 163 | 176 | 174 | 165 |
| Tensile strength at break TD | (MPa) | 127 | n.d. | 193 | 168 | 154 |
| Elongation at break MD | (%) | 191 | 141 | 104 | 106 | 107 |
| Elongation at break TD | (%) | 207 | n.d. | 104 | 111 | 121 |
| Modulus of Elasticity MD | (MPa) | 1432 | 1020 | 1667 | 1611 | 1699 |
| Modulus of Elasticity TD | (MPa) | 1392 | n.d. | 1738 | 1564 | 1663 |
| Haze | (%) | n.d. | n.d. | 8.3 | 6.5 | 5.6 |
| Gloss (45°) | | n.d. | n.d. | 73 | 79 | 80 |

n.d. not determined

From the results it can be seen that the improved balance of processability, homogeneity and mechanical properties are obtained for the films made with the polyethylene resin PE1.

The invention claimed is:

1. A biaxially-oriented polyethylene film characterized in that it comprises a polyethylene resin having:

a melt index $MI_2$ ranging from 0.5 to 3.0 g/10 min as determined according to ISO 1133-2005 at 190 °C under a load of 2.16 kg;

a density of at least 0.950 g/cm$^3$ as determined according to ISO 1183-1:2012 at 23 °C;

an Mw/Mn of at least 8.0 as determined by gel permeation chromatography;

a z average molecular weight (Mz) of at least 800,000 g/mol as determined by gel permeation chromatography; and an Mz/Mw of at least 6.0 as determined by gel permeation chromatography, wherein the polyethylene resin is an ethylene copolymer resin with a comonomer content ranging from 0.5 to 2.5 wt. % based on the total weight of the polyethylene resin as determined by $^{13}$C-NMR analysis as defined in the description, and in that in a Temperature Rising Elution Fractionation (TREF) profile obtained by a TREF analysis as defined in the description:

the polyethylene resin has one elution peak from 35 to 120 °C, excluding purge; and/or has a main elution peak above 100 °C.

2. The film according to claim 1 is characterised in that the polyethylene resin is selected from an ethylene homopolymer, a copolymer of ethylene with one or more comonomers selected from $C_3$-$C_{20}$ alpha-olefins and any mixture thereof and has a comonomer content of at most 2.5 wt. % based on the total weight of the polyethylene resin as determined by $^{13}$C-NMR analysis as defined in the description.

3. The film according to claim 1 is characterised in that the polyethylene resin has:

a density ranging from 0.953 g/cm$^3$ to 0.962 g/cm$^3$ as determined according to ISO 1183-1:2012 at 23 °C;

an Mw/Mn ranging from 9.2 to 14.0 as determined by gel permeation chromatography; and an Mz/Mw ranging from 6.5 to 10.0 as determined by gel permeation chromatography.

4. The film according to claim 1 is characterized in that the polyethylene resin is Ziegler-Natta catalysed, and/or in that the polyethylene resin has:

a melt index $MI_2$ ranging from 0.6 to 2.5 g/10 min as determined according to ISO 1133-2005 at 190 °C under a load of 2.16 kg; and a comonomer content ranging from 0.1 to 2.5 wt. % based on the total weight of the polyethylene resin as determined by 13C-NMR analysis as defined in the description.

5. The film according to claim 1 is characterized in that the polyethylene resin has a high load melt index HLMI ranging from 35 g/10 min to 140 g/10 min as determined according to ISO 1133-2005 at 190 °C under a load of 21.6 kg.

6. The film according to claim 1 is characterized in that the polyethylene resin has a HLMI/$MI_2$ ratio of at least 60.

7. The film according to claim 1 is characterized in that the polyethylene resin has a density of at least 0.955 g/cm$^3$ as determined according to ISO 1183-1:2012 at 23 °C.

8. The film according to claim 1 is characterized in that the polyethylene resin has a bimodal or multimodal molecular weight distribution.

9. The film according to claim 1 is characterized in that the polyethylene resin has a z average molecular weight (Mz) ranging from 850,000 to 1,800,000 g/mol as determined by gel permeation chromatography.

10. The film according to claim 1 is characterized in that the polyethylene resin is present in the film at a content of at least 50 wt. % based on the total weight of the biaxially-oriented polyethylene film.

11. The film according to claim 1 is characterized in that the polyethylene resin is a copolymer of ethylene with one or more comonomers selected from the group comprising propylene, butene-1, pentene-1, hexene-1, heptene-1, octene-1, nonene-1, decene-1 and any mixture thereof.

12. The film according to claim 1 is characterized in that the polyethylene resin has:

a zero-shear viscosity of at least 20 000 Pa·s as determined according to the method defined in the description; and/or a melting temperature Tm of at least 125 °C as determined according to ISO 11357-3:2018.

13. The film according to claim 1 is characterized in that the film is a multi-layered film comprising two skin layers, a core layer, and one or more optional intermediate layers placed between a skin layer and the core layer, wherein the polyethylene resin is present in the core layer and optionally is also present in one or more intermediate layers and/or in one or more skin layers.

14. The film according to claim 1 is characterized in that the film is a single layer film and has a thickness ranging from 10 to 60 μm as determined by DIN ISO 4593; or in that the film is a multi-layered film wherein one or more layers comprise the polyethylene resin and wherein the film has a thickness ranging from 10 to 60 μm as determined by DIN ISO 4593.

15. A polyethylene resin, for the production of a biaxially-oriented polyethylene film according to claim 1, characterized in that it has:

a melt index $MI_2$ ranging from 0.5 to 3.0 g/10 min as determined according to ISO 1133-2005 at 190 °C under a load of 2.16 kg;

a density of at least 0.950 g/cm$^3$ as determined according to ISO 1183-1:2012 at 23 °C;

an Mw/Mn of at least 8.0 as determined by gel permeation chromatography;

a z average molecular weight (Mz) of at least 800,000 g/mol as determined by gel permeation chromatography; and an Mz/Mw of at least 6.0 as determined by gel permeation chromatography.

16. A process to produce a biaxially-oriented polyethylene film according to claim 1, characterized in that comprises:

a) producing a polyethylene resin having:

a melt index $MI_2$ ranging from 0.5 to 3.0 g/10 min as determined according to ISO 1133-2005 at 190 °C under a load of 2.16 kg;

a density of at least 0.950 g/cm$^3$ as determined according to ISO 1183-1:2012 at 23 °C;

an Mw/Mn of at least 8.0 as determined by gel permeation chromatography;

a z average molecular weight (Mz) of at least 800,000 g/mol as determined by gel permeation chromatography; and an Mz/Mw of at least 6.0 as determined by gel permeation chromatography;

b) extruding or casting a film comprising the polyethylene resin;

c) stretching the film in a machine direction and in a transverse direction to produce a biaxially-oriented polyethylene film wherein stretching in the machine direction is at a stretch ratio from 4.5 to 7.0 and stretching in the transverse direction is at a stretch ratio in the range from 6.0 to 10.0.

17. The process according to claim 16 is characterized in that the film is a single-layer film or a multi-layered film so that it comprises one or more layers and in that the polyethylene resin is present in the film at a content of at least 50 wt. % based on the total weight of the biaxially-oriented polyethylene film.

18. The process according to claim 16 is characterized in that the step of producing a polyethylene resin is performed in two slurry loop reactors sequentially connected wherein the one or more comonomers are introduced in the first reactor only and/or in that step of producing a polyethylene resin is performed in two slurry loop reactors sequentially connected defining a first and a second polyethylene fraction wherein the first polyethylene fraction has a density of at least 0.930 g/cm$^3$ to according to ISO 1183-1:2012 at 23 °C, and a melt index HL275 ranging from 3.0 g/10 min to 30.0 g/10 min, wherein melt index HL275 is determined in the same way as the HLMI except that the die opening has a diameter 2.75 mm, HL275 can be converted to HLMI using the following equation HLMI=HL275/3.2.

19. The film according to claim 1 is characterized in that the polyethylene resin is a copolymer of ethylene and hexene-1.

* * * * *